(12) United States Patent
Huang

(10) Patent No.: US 12,476,856 B2
(45) Date of Patent: Nov. 18, 2025

(54) ACCESS POINT, STATION, AND WIRELESS COMMUNICATION METHOD

(71) Applicant: GUANGDONG OPPO MOBILE TELECOMMUNICATIONS CORP., LTD., Guangdong (CN)

(72) Inventor: Lei Huang, Singapore (SG)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 351 days.

(21) Appl. No.: 18/297,970

(22) Filed: Apr. 10, 2023

(65) Prior Publication Data
US 2023/0246896 A1 Aug. 3, 2023

Related U.S. Application Data

(63) Continuation of application No. PCT/CN2021/123474, filed on Oct. 13, 2021.

(30) Foreign Application Priority Data

Oct. 21, 2020 (SG) .......................... 10202010452R

(51) Int. Cl.
*H04L 27/26* (2006.01)
*H04L 5/00* (2006.01)

(52) U.S. Cl.
CPC ........ *H04L 27/2621* (2013.01); *H04L 5/0044* (2013.01)

(58) Field of Classification Search
None
See application file for complete search history.

(56) References Cited

U.S. PATENT DOCUMENTS

| | | |
|---|---|---|
| 2012/0051454 A1 | 3/2012 | Zheng et al. |
| 2017/0079071 A1 | 3/2017 | Zhou et al. |

(Continued)

FOREIGN PATENT DOCUMENTS

| | | |
|---|---|---|
| CN | 111726203 | 9/2020 |
| WO | 2020040622 | 2/2020 |
| WO | 2020050527 | 3/2020 |

OTHER PUBLICATIONS

Cheong, "Proposed Text for Gamma Phase Rotation for HE PPDU," doc.: IEEE 802.11-16/0904r0, IEEE P802.11, Wireless LANs, Jul. 2016.

(Continued)

*Primary Examiner* — Diane L Lo
(74) *Attorney, Agent, or Firm* — Hodgson Russ LLP

(57) ABSTRACT

An access point (AP), a station (STA), and a wireless communication method are provided. The wireless communication method includes configuring, by an access point (AP), an aggregated physical layer (PHY) protocol data unit (A-PPDU) to a set of stations (STAs), wherein the A-PPDU comprises at least one first PPDU and at least one second PPDU, and phase rotation is applied to the A-PPDU according to at least one bandwidth associated with at least one of the A-PPDU, the at least one first PPDU, and the at least one second PPDU. This can solve issues in the prior art, apply phase rotation to an A-PPDU, improve peak-to-average power ratio (PAPR) of the A-PPDU, achieve extremely high throughput (EHT), provide a good communication performance, and/or provide high reliability.

15 Claims, 17 Drawing Sheets

900

902 — Determining, by a station (STA) of a set of STAs, an aggregated physical layer (PHY) protocol data unit (A-PPDU) from an access point (AP), wherein the A-PPDU comprises at least one first PPDU and at least one second PPDU, and phase rotation is applied to the A-PPDU according to at least one bandwidth associated with at least one of the A-PPDU, the at least one first PPDU, and the at least one second PPDU

(56) References Cited

U.S. PATENT DOCUMENTS

| | | | |
|---|---|---|---|
| 2019/0069213 A1 | 2/2019 | Seok et al. | |
| 2019/0097850 A1* | 3/2019 | Kenney | H04L 27/0012 |
| 2019/0289612 A1* | 9/2019 | Chen | H04L 27/2613 |
| 2020/0037325 A1 | 1/2020 | Chu et al. | |
| 2020/0305164 A1 | 9/2020 | Yang et al. | |
| 2021/0250125 A1 | 8/2021 | Park et al. | |
| 2021/0344540 A1* | 11/2021 | Park | H04L 27/2603 |
| 2021/0391961 A1* | 12/2021 | Cao | H04L 1/08 |

OTHER PUBLICATIONS

Schelstraete, "Minutes 802.11 be PHY ad hoc Telephone Conferences, May-Jul. 2020," doc.: IEEE 802.11-20/0787r6, IEEE P802.11, Wireless LANs, May 2020.

Zhang et al., "Proposed Draft Text: Mathematical description of signals," doc.: IEEE 802.11-20/1337r3, IEEE P802.11, Wireless LANs, Aug. 2020.

IEEE Standard for Information technology: Telecommunications and information exchange between systems—Local and metropolitan area networks—Specific requirements: Part 11: Wireless LAN Medium Access Control (MAC) and Physical Layer (PHY) Specifications, IEEE Std 802.11-2016, Dec. 2016.

EPO, Extended European Search Report for EP Application No. 21881899.5, Mar. 12, 2024.

"Aggregated PPDU for Large BW," IEEE 802.11-20/0693r1, May 2020.

"Specification Framework for TGbe," IEE P802.11, 20/1262r15, Sep. 2020.

WIPO, International Search Report and Written Opinion for PCT/CN2021/123474, Jan. 5, 2022.

"Forward Compatible OFDMA," IEEE 802.11-20/0674r3, Mar. 2020.

"Draft Standard for Information technology—Telecommunications and information exchange between systems Local and metropolitan area networks—Specific requirements: Part 11: Wireless LAN Medium Access Control (MAC) and Physical Layer (PHY) Specifications," IEEE P802.11ax/D7.0 (amendment to IEEE P802.11REVmd/D4.0, Sep. 2020.

* cited by examiner

ACCESS POINT, STATION, AND WIRELESS COMMUNICATION METHOD

CROSS-REFERENCE TO RELATED APPLICATION

This application is a continuation of International Application No. PCT/CN2021/123474, filed Oct. 13, 2021, the entire disclosure of which is incorporated herein by reference.

TECHNICAL FIELD

The present disclosure relates to the field of communication systems, and more particularly, to an access point (AP), a station (STA), and a wireless communication method, which can provide a good communication performance and/or provide high reliability.

BACKGROUND

Communication systems such as wireless communication systems are widely deployed to provide various types of communication content such as voice, video, packet data, messaging, broadcast, and so on. These communication systems may be multiple-access systems capable of supporting communication with multiple users by sharing available system resources (such as, time, frequency, and power). A wireless network, for example a wireless local area network (WLAN), such as a Wi-Fi (institute of electrical and electronics engineers (IEEE) 802.11) network may include an access point (AP) that may communicate with one or more stations (STAs) or mobile devices. The WLAN enables a user to wirelessly access an internet based on radio frequency technology in a home, an office, or a specific service area using a portable terminal such as a personal digital assistant (PDA), a laptop computer, a portable multimedia player (PMP), a smartphone, etc. The AP may be coupled to a network, such as the internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink may refer to a communication link from the AP to the STA, and the uplink may refer to a communication link from the STA to the AP.

In recent times, to support increased numbers of devices supporting WLAN, such as smartphones, more APs have been deployed. Despite increase in use of WLAN devices supporting the IEEE 802.11ax high efficiency (HE) WLAN standard, that provide high performance relative to WLAN devices supporting the legacy IEEE 802.11g/n/ac standard, a WLAN system supporting higher performance is required due to WLAN users' increased use of high volume content such as a ultra-high definition video. Although a conventional WLAN system has aimed at increase of bandwidth and improvement of a peak transmission rate, actual users thereof could not feel drastic increase of such performance.

In a task group called IEEE 802.11be, extremely high throughput (EHT) WLAN standardization is under discussion. The EHT WLAN aims at achieving extremely high throughput (EHT) and/or improving performance felt by users demanding high-capacity, high-rate services while supporting simultaneous access of numerous stations in an environment in which a plurality of APs is densely deployed and coverage areas of APs overlap.

IEEE 802.11be EHT WLAN supports a bandwidth (BW) up to 320 MHz. It is expected that high efficiency (HE) STAs will exist with EHT STAs in a same EHT basic service set (BSS). In order to maximize throughput of an EHT BSS with large BW (e.g. 320 MHz), an aggregated physical layer (PHY) protocol data unit (A-PPDU) has been proposed.

No specified method for aggregating different formats of physical layer (PHY) protocol data units (PPDUs) in the A-PPDU is provided. How to apply phase rotation to the A-PPDU is an open issue.

Therefore, there is a need for an access point (AP), a station (STA), and a wireless communication method, which can solve issues in the prior art, apply phase rotation to an A-PPDU, improve peak-to-average power ratio (PAPR) of the A-PPDU, achieve extremely high throughput (EHT), provide a good communication performance, and/or provide high reliability.

SUMMARY

An object of the present disclosure is to propose an access point (AP), a station (STA), and a wireless communication method, which can solve issues in the prior art, apply phase rotation to an A-PPDU, improve peak-to-average power ratio (PAPR) of the A-PPDU, achieve extremely high throughput (EHT), provide a good communication performance, and/or provide high reliability.

In a first aspect of the present disclosure, a wireless communication method comprises configuring, by an access point (AP), an aggregated physical layer (PHY) protocol data unit (A-PPDU) to a set of stations (STAs), wherein the A-PPDU comprises at least one first PPDU and at least one second PPDU, and phase rotation is applied to the A-PPDU according to at least one bandwidth associated with at least one of the A-PPDU, the at least one first PPDU, and the at least one second PPDU.

In a second aspect of the present disclosure, a wireless communication method comprises determining, by a station (STA) of a set of STAs, an aggregated physical layer (PHY) protocol data unit (A-PPDU) from an access point (AP), wherein the A-PPDU comprises at least one first PPDU and at least one second PPDU, and phase rotation is applied to the A-PPDU according to at least one bandwidth associated with at least one of the A-PPDU, the at least one first PPDU, and the at least one second PPDU.

In a third aspect of the present disclosure, an access point (AP) comprises a memory, a transceiver, and a processor coupled to the memory and the transceiver. The processor is configured to configure an aggregated physical layer (PHY) protocol data unit (A-PPDU) to a set of stations (STAs), wherein the A-PPDU comprises at least one first PPDU and at least one second PPDU, phase rotation is applied to the A-PPDU according to at least one bandwidth associated with at least one of the A-PPDU, the at least one first PPDU, and the at least one second PPDU.

In a fourth aspect of the present disclosure, a station (STA) comprises a memory, a transceiver, and a processor coupled to the memory and the transceiver. The processor is configured to determine an aggregated physical layer (PHY) protocol data unit (A-PPDU) from an access point (AP), wherein the A-PPDU comprises at least one first PPDU and at least one second PPDU, phase rotation is applied to the A-PPDU according to at least one bandwidth associated with at least one of the A-PPDU, the at least one first PPDU, and the at least one second PPDU.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF THE DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Institute of electrical and electronics engineers (IEEE) 802.11be extremely high throughput (EHT) WLAN supports a bandwidth (BW) up to 320 MHz. It is expected that high efficiency (HE) stations (STAs) will exist with extremely high throughput (EHT) STAs in a same EHT basic service set (BSS). In order to maximize throughput of an EHT BSS with large BW (e.g. 320 MHz), an aggregated physical layer (PHY) protocol data unit (A-PPDU) in some embodiments of the present disclosure has been proposed.

Figure 1:
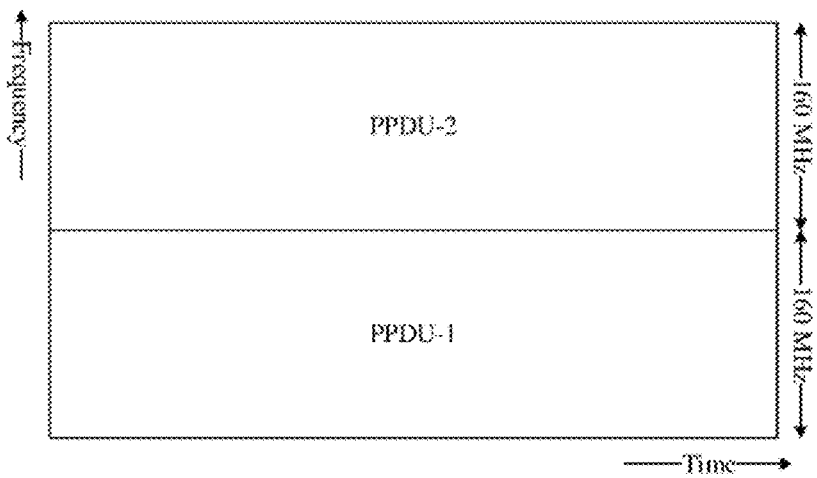
FIG. 1 is a schematic diagram illustrating an example of 320 MHz bandwidth (BW) frequency-domain (FD) A-PPDU (FD-A-PPDU) according to an embodiment of the present disclosure.

FIG. 1 illustrates an example of 320 MHz bandwidth (BW) frequency-domain (FD) A-PPDU (FD-A-PPDU)

according to an embodiment of the present disclosure. FIG. 1 illustrates that, in some embodiments, a FD-A-PPDU consists of multiple PPDUs such as PPDU-1 and PPDU-2. Each PPDU occupies one or more non-overlapping 80 MHz frequency segments. The PPDUs are orthogonal in frequency domain symbol-by-symbol. Each PPDU can have different PPDU formats, e.g. HE PPDU, EHT PPDU, etc.

Figure 2A:
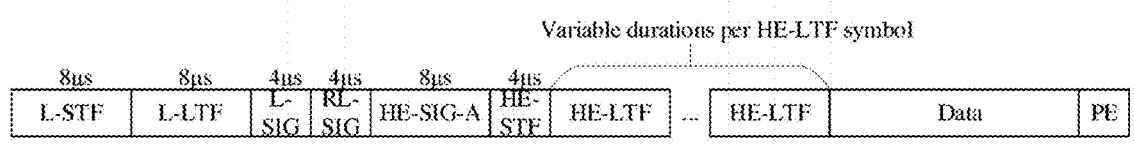
FIG. 2A is a schematic diagram illustrating an example of high efficiency (HE) single user (SU) PPDU format according to an embodiment of the present disclosure.
Figure 2B:
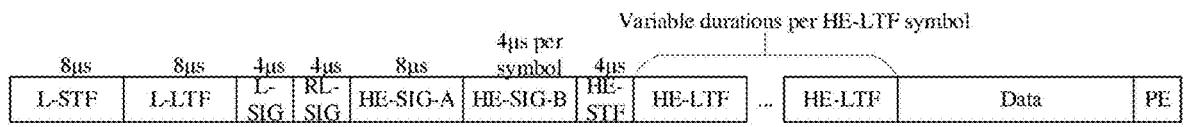
FIG. 2B is a schematic diagram illustrating an example of HE multi-user (MU) PPDU format according to an embodiment of the present disclosure.
Figure 2C:
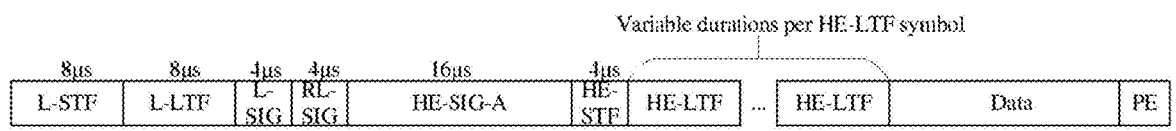
FIG. 2C is a schematic diagram illustrating an example of HE extended range (ER) SU PPDU format according to an embodiment of the present disclosure.
Figure 2D:
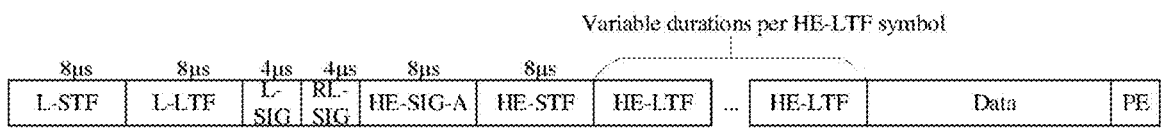
FIG. 2D is a schematic diagram illustrating an example of HE trigger-based (TB) PPDU format according to an embodiment of the present disclosure.

FIG. 2A illustrates an example of high efficiency (HE) single user (SU) PPDU format according to an embodiment of the present disclosure. FIG. 2B illustrates an example of HE multi-user (MU) PPDU format according to an embodiment of the present disclosure. FIG. 2C illustrates an example of HE extended range (ER) SU PPDU format according to an embodiment of the present disclosure. FIG. 2D illustrates an example of HE trigger-based (TB) PPDU format according to an embodiment of the present disclosure. HE PPDU has four formats: HE SU PPDU, HE ER SU PPDU, HE MU PPDU, and HE TB PPDU. The HE SU PPDU format as illustrated in FIG. 2A is used for SU transmission and, in this format, the HE-SIG-A field is not repeated. The HE MU PPDU format illustrated in FIG. 2B is used for transmission to one or more users if the PPDU is not a response of a triggering frame. In the HE MU PPDU, HE SIGNAL A field (HE-SIG-A) is not repeated, and HE SIGNAL B field (HE-SIG-B) is present in this format. The HE ER SU PPDU format illustrated in FIG. 2C is used for extended range SU transmission and, in this format, the HE-SIG-A is twice as long as the HE-SIG-A in other HE PPDU formats. The HE ER SU PPDU supports only a single 242-tone or 106-tone resource unit (RU) within primary 20 MHz channel. The HE TB PPDU format illustrated in FIG. 2D is used for a transmission that is a response to a triggering frame from an AP. The format of the HE TB PPDU is the same as the HE SU PPDU except that the duration of the HE-STF field in the HE TB PPDU is twice the duration of the HE-STF field in the HE SU PPDU.

For a HE PPDU, each HE long training field (HE-LTF) symbol has the same guard interval (GI) duration as each data symbol, which is 0.8 µs, 1.6 µs, or 3.2 µs. The HE-LTF field comprises three types: 1×HE-LTF, 2×HE-LTF, and 4×HE-LTF. The duration of each 1×HE-LTF, 2×HE-LTF, or 4×HE-LTF symbol without GI is 3.2 µs, 6.4 µs, or 12.8 µs. Only 2×HE-LTF and 4×HE-LTF are supported in HE MU PPDU. Each data symbol without GI is 12.8 µs.

Figure 3A:
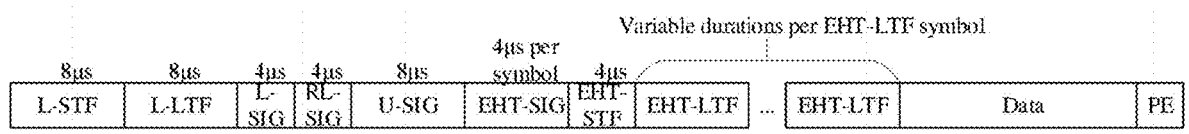
FIG. 3A is a schematic diagram illustrating an example of extremely high throughput (EHT) MU PPDU format according to an embodiment of the present disclosure.
Figure 3B:
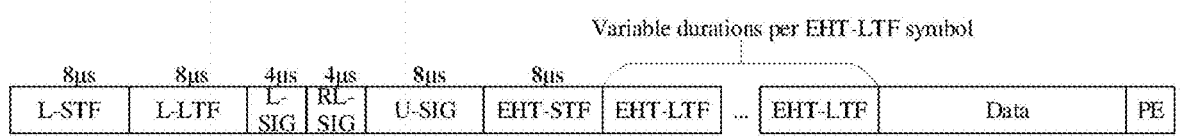
FIG. 3B is a schematic diagram illustrating an example of EHT TB PPDU format according to an embodiment of the present disclosure.

FIG. 3A illustrates an example of extremely high throughput (EHT) MU PPDU format according to an embodiment of the present disclosure. FIG. 3B illustrates an example of EHT TB PPDU format according to an embodiment of the present disclosure. EHT PPDU has two formats: EHT MU PPDU and EHT TB PPDU. The EHT MU PPDU format as illustrated in FIG. 3A is used for transmission to one or more users if the PPDU is not a response of a triggering frame. The EHT-SIG field is present in the EHT MU PPDU. The EHT TB PPDU format as illustrated in FIG. 3B is used for a transmission that is a response to a triggering frame from an AP. The EHT-SIG field is not present in the EHT TB PPDU. The duration of the EHT-STF field in the EHT TB PPDU is twice the duration of the EHT-STF field in the EHT MU PPDU.

For an EHT PPDU, each EHT-LTF symbol has the same GI duration as each data symbol, which is 0.8 µs, 1.6 µs, or 3.2 µs. The EHT-LTF field comprises three types: 1×EHT-LTF, 2×EHT-LTF, and 4×EHT-LTF. The duration of each 1×EHT-LTF, 2×EHT-LTF, or 4×EHT-LTF symbol without GI is 3.2 µs, 6.4 µs, or 12.8 µs. Each data symbol without GI is 12.8 µs.

In an EHT BSS, HE SU PPDU, HE ER SU PPDU, HE MU PPDU, and EHT MU PPDU can be used for downlink SU transmission while HE MU PPDU and EHT MU PPDU can be used for downlink MU transmission. On the other hand, HE SU PPDU, HE ER SU PPDU, HE MU PPDU, and EHT MU PPDU can be used for uplink SU transmission while HE TB PPDU and EHT TB PPDU can be used for uplink MU transmission. In construction of each of the pre-HE modulated fields in a HE PPDU, an appropriate phase rotation is applied to each 20 MHz subchannel to minimize the HE PPDU's PAPR. Similarly, in construction of each of the pre-EHT modulated fields in an EHT PPDU, an appropriate phase rotation is applied to each 20 MHz subchannel to minimize the EHT PPDU's PAPR. The function $Y_{k,BW}$ is used to represent a rotation of the tones, where k represents tone or subcarrier index. However, it is unclear how to apply phase rotation to a FD-A-PPDU.

For a 20 MHz HE or EHT PPDU transmission where $k \in [-32, 31]$.

$$Y_{k,20} = 1 \tag{1}$$

For a 40 MHz HE or EHT PPDU transmission where $k \in [-64, 63]$.

$$Y_{k,40} = \begin{cases} 1, & k < 0 \\ j, & k \geq 0 \end{cases} \tag{2}$$

For an 80 MHz HE or EHT PPDU transmission where $k \in [-128, 127]$.

$$Y_{k,80} = \begin{cases} 1, & k < -64 \\ -1, & k \geq -64 \end{cases} \tag{3}$$

For a 160 MHz HE or EHT PPDU transmission where $k \in [-256, 255]$.

$$Y_{k,160} = \begin{cases} 1, k < -192 \\ -1, -192 \leq k < 0 \\ 1, 0 \leq k < 64 \\ -1, k \geq 64 \end{cases} \tag{4}$$

For a 320 MHz EHT PPDU transmission where $k \in [-512, 511]$.

$$Y_{k,320} = \begin{cases} 1, k < -448 \\ -1, -448 \leq k < -256 \\ 1, -256 \leq k < -192 \\ -1, -192 \leq k < 64 \\ 1, 64 \leq k < 256 \\ -1, 256 \leq k < 320 \\ 1, k \geq 320 \end{cases} \tag{5}$$

The following description is directed to certain implementations for the purposes of describing the innovative aspects of the present disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the IEEE 802.11 standards, the Bluetooth® standard, code division multiple access (CDMA), frequency division multiple access (FDMA), time division multiple access (TDMA), global system for mobile communications (GSM), GSM/general packet radio service (GPRS), enhanced data GSM environment (EDGE), terrestrial trunked radio (TETRA), wideband-CDMA (W-CDMA), evolution data optimized (EV-DO), 1×EV-DO, EV-DO Rev A, EV-DO Rev B, high speed packet access (HSPA), high speed downlink packet access (HSDPA), high speed uplink packet access (HSUPA), evolved high speed packet access (HSPA+), long term evolution (LTE), AMPS, or other known signals that are used to communicate within a wireless, cellular or internet of things (IOT) network, such as a system utilizing 3G, 4G, or 5G, or further implementations thereof, technology.

Techniques are disclosed for wireless devices to support multiplexing clients of different generations in trigger-based transmissions. For example, an access point (AP) that supports multiple generations of station (STA) may support uplink transmissions in, for example, an extremely-high throughput (EHT) wireless communications system. EHT systems also may be referred to as ultra-high throughput (UHT) systems, next generation Wi-Fi systems, or next big thing (NBT) systems, and may support coverage for multiple types of mobile stations (STAs). For example, an AP in an EHT system may provide coverage for EHT STAs, as well as legacy (or high efficiency (HE)) STAs. The AP may multiplex boy EHT STAs and HE STAs in trigger-based uplink transmissions. That is, the AP may operate using techniques to provide backwards compatibility for HE STAs, while providing additional functionality for EHT STAs.

To trigger uplink transmissions from one or more STAs of different generations, the AP may transmit a triggering frame. The triggering frame may be formatted as a legacy triggering frame so that HE STAs may detect and process the triggering frame to determine uplink transmissions. The AP may include resource unit (RU) allocations in the triggering frame. An STA may receive the triggering frame, identify the RU allocation corresponding to that STA, and may transmit an uplink transmission to the AP using the allocated resources. Legacy STAs may support transmitting in a narrower bandwidth (for example, 160 megahertz (MHz)) than EHT STAs (which may transmit in a 320 MHz bandwidth). The AP may include an additional indication in the triggering frame for EHT STAs, so that the EHT STAs may identify the bandwidth to use (for example, the legacy bandwidth or the greater EHT bandwidth).

In some implementations, the AP and EHT STAs may use a new EHT RU allocation table when operating in the larger bandwidth. An EHT STA receiving the triggering frame may use a same RU allocation field as HE STAs to determine the RU allocation index, but may use a different table to look up an entry corresponding to the RU allocation index. In some other implementations, the AP may include an additional bit in the triggering frame to indicate to EHT STAs whether to use a primary or a secondary 160 MHz portion of the 320 MHz bandwidth. The EHT STAs may use a legacy RU allocation table, which also may include an additional entry corresponding to this wider bandwidth. In yet some other implementations, the AP may order the RU allocations in the triggering frame in increasing order. An EHT STA may parse the user information for multiple STAs, and may sum the allocated resources for each STA preceding the resource allocation for that EHT STA. The EHT STA may determine the resources for transmission based on the sum and the ordering of the allocations. In each of these implementations, legacy STAs may utilize legacy operations to determine a bandwidth for transmission based on a bandwidth field in the triggering frame. Additionally, if the triggering frame does not indicate the wider EHT bandwidth, an EHT STA may utilize this legacy bandwidth field to determine the resources for transmission.

Figure 4:
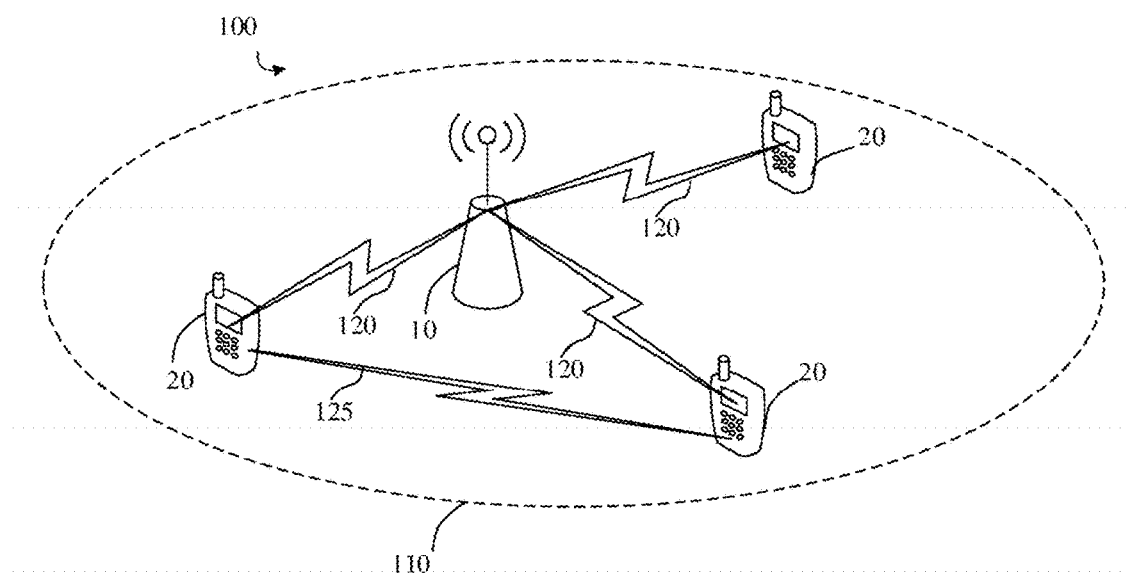
FIG. 4 is a schematic diagram illustrating an example of a wireless communications system according to an embodiment of the present disclosure.

FIG. 4 illustrates an example of a wireless communications system according to an embodiment of the present disclosure. The wireless communications system may be an example of a wireless local area network (WLAN) 100 (also known as a Wi-Fi network) (such as next generation, next big thing (NBT), ultra-high throughput (UHT) or EHT Wi-Fi network) configured in accordance with various aspects of the present disclosure. As described herein, the terms next generation, NBT, UHT, and EHT may be considered synonymous and may each correspond to a Wi-Fi network supporting a high volume of space-time-streams. The WLAN 100 may include an AP 10 and multiple associated STAs 20, which may represent devices such as mobile stations, personal digital assistant (PDAs), other handheld devices, netbooks, notebook computers, tablet computers, laptops, display devices (such as TVs, computer monitors, etc.), printers, etc. The AP 10 and the associated stations 20 may represent a basic service set (BSS) or an extended service set (ESS). The various STAs 20 in the network can communicate with one another through the AP 10. Also illustrated is a coverage area 110 of the AP 10, which may represent a basic service area (BSA) of the WLAN 100. An extended network station (not shown) associated with the WLAN 100 may be connected to a wired or wireless distribution system that may allow multiple APs 10 to be connected in an ESS.

In some embodiments, a STA 20 may be located in the intersection of more than one coverage area 110 and may associate with more than one AP 10. A single AP 10 and an associated set of STAs 20 may be referred to as a BSS. An ESS is a set of connected BSSs. A distribution system (not shown) may be used to connect APs 10 in an ESS. In some cases, the coverage area 110 of an AP 10 may be divided into sectors (also not shown). The WLAN 100 may include APs 10 of different types (such as a metropolitan area, home network, etc.), with varying and overlapping coverage areas 110. Two STAs 20 also may communicate directly via a direct wireless link 125 regardless of whether both STAs 20 are in the same coverage area 110. Examples of direct wireless links 120 may include Wi-Fi direct connections, Wi-Fi tunneled direct link setup (TDLS) links, and other group connections. STAs 20 and APs 10 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11ay, etc. In some other implementations, peer-to-peer connections or ad hoc networks may be implemented within the WLAN 100.

Figure 5:
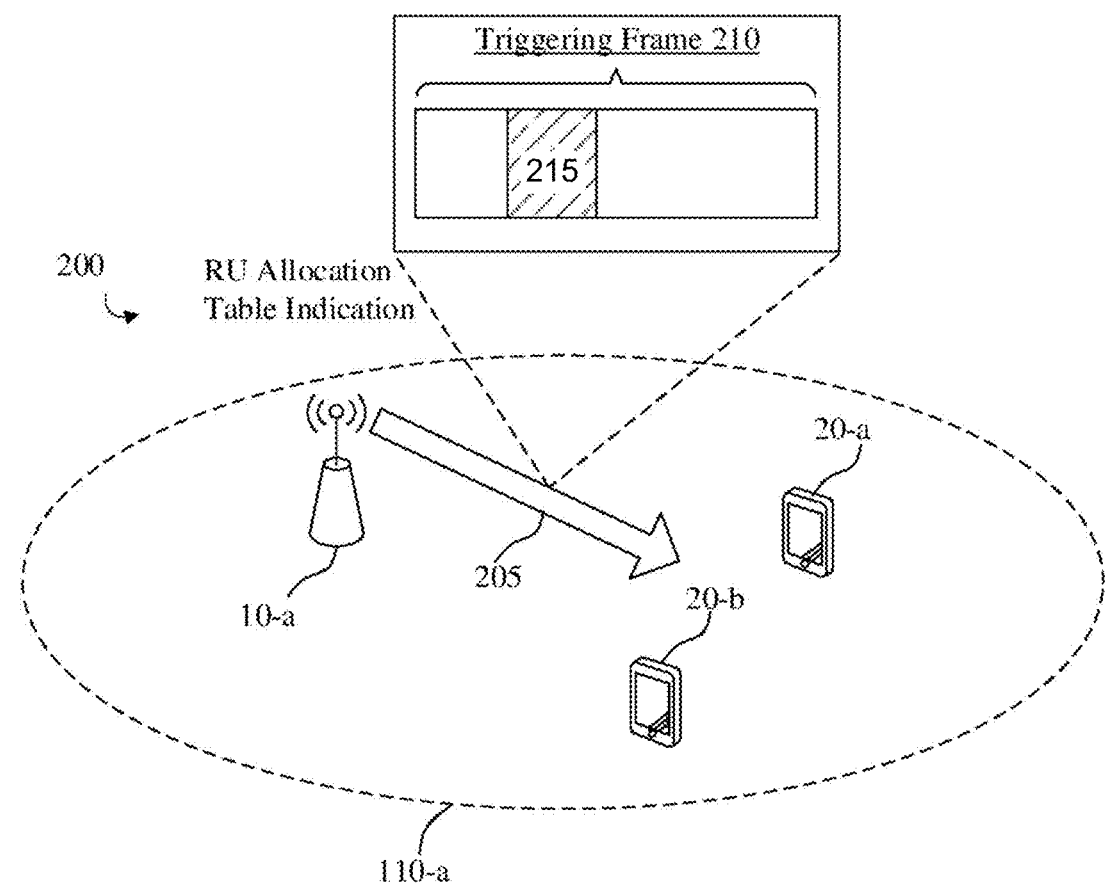
FIG. 5 is a schematic diagram illustrating an example of a wireless communications system according to another embodiment of the present disclosure.

FIG. 5 illustrates an example of a wireless communications system according to another embodiment of the present disclosure. The wireless communications system 200 may be an example of a next generation or EHT Wi-Fi system, and may include an AP 10-*a* and STAs 20-*a* and 20-*b*, and a coverage area 110-*a*, which may be examples of components described with respect to FIG. 4. The AP 10-*a* may transmit a triggering frame 210 including an RU allocation table indication 215 on the downlink 205 to the STAs 20.

In some implementations, a wireless communications system 200 may be a next generation Wi-Fi system (such as, an EHT system). In some implementations, wireless communications system 200 may also support multiple communications systems. For instance, wireless communications system 200 may support EHT communications and HE communications. In some implementations, the STA 20-*a* and the STA 20-*b* may be different types of STAs. For example, the STA 20-*a* may be an example of an EHT STA, while the STA 20-*b* may be an example of an HE STA. The STA 20-*b* may be referred to as a legacy STA.

In some instances, EHT communications may support a larger bandwidth than legacy communications. For instance, EHT communications may occur over an available bandwidth of 320 MHz, whereas legacy communications may occur over an available bandwidth of 160 MHz. Additionally, EHT communications may support higher modulations than legacy communications. For instance, EHT communications may support 4K quadrature amplitude modulation (QAM), whereas legacy communications may support 1024 QAM. EHT communications may support a larger number of spatial streams (such as, space-time-streams) than legacy systems. In one non-limiting illustrative example, EHT communications may support 16 spatial streams, whereas legacy communications may support 8 spatial streams. In some cases, EHT communications may occur a 2.4 GHz channel, a 5 GHz channel, or a 6 GHz channel in unlicensed spectrum.

In some implementations, AP 10-*a* may transmit a triggering frame 210 to one or more STAs 20 (such as, STA 20-*a* and STA 20-*b*). In some implementations, the triggering frame may solicit an uplink transmission from the STAs 20. However, the triggering frame 210 may be received by an EHT STA 20-*a* and HE STA 20-*b*. The triggering frame 210 may be configured to solicit an uplink transmission from only HE STAs 20-*b*. In some implementations, triggering frame 210 may be configured to solicit an uplink transmission from EHT STAs 20-*a*. In some other implementations, the triggering frame 210 may be configured to solicit an uplink transmission from one or more EHT STAs 20-*a* and one or more HE STAs 20-*b*.

Figure 6:
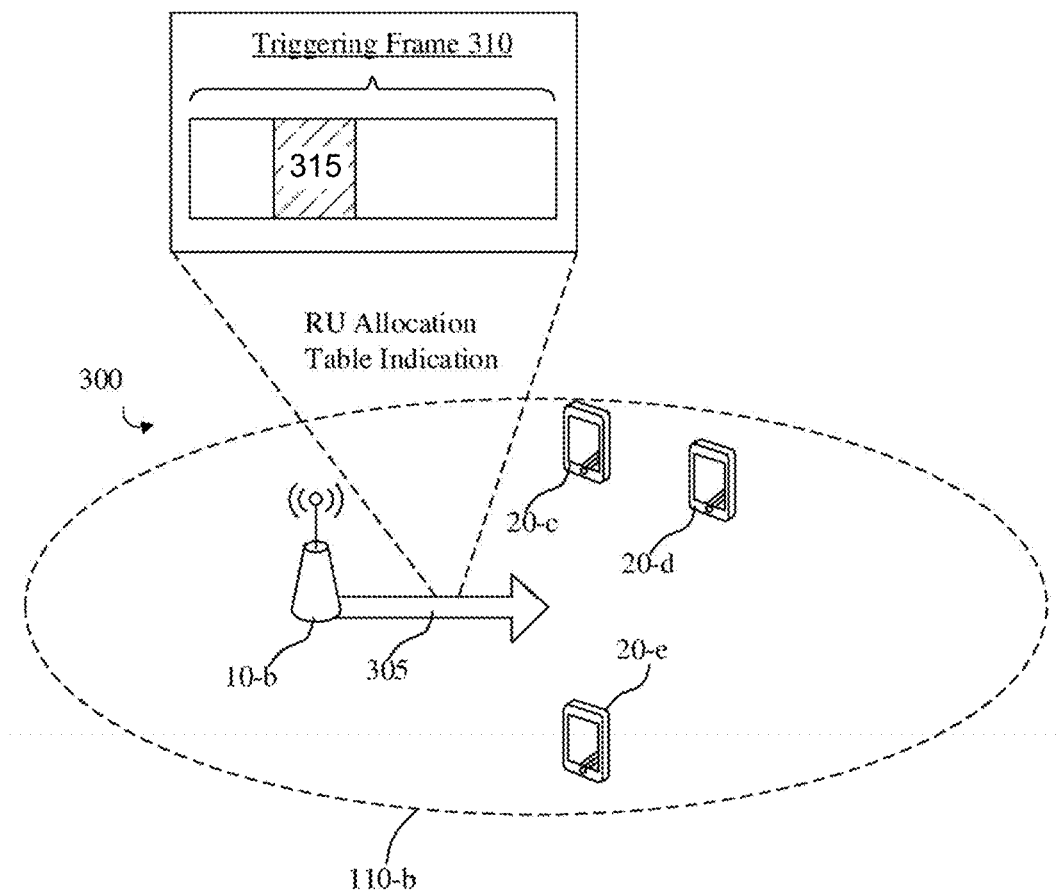
FIG. 6 is a schematic diagram illustrating an example of a wireless communications system according to another embodiment of the present disclosure.

FIG. 6 illustrates an example of a wireless communications system according to another embodiment of the present disclosure. The wireless communications system 300 may be an example of a post-EHT Wi-Fi system, and may include an AP 10-*b*. AP 10-*b* may be an example of a post-EHT AP 10. The wireless communications system 300 may include HE STA 20-*c*, EHT STA 20-*d*, and post-EHT STA 20-*e*, and a coverage area 110-*b*, which may be examples of components described with respect to FIGS. 5 and 6. The AP 10-*b* may transmit a triggering frame 310 including an RU allocation table indication 315 on the downlink 305 to the STAs 20. In some implementations, STAs 20 may be referred to as clients.

In some implementations, an EHT AP 10 may serve both HE STAs 20 and EHT STAs 20. The EHT AP 10 may send a triggering frame that may trigger a response from HE STAs 20 only, from EHT STAs 20 only, or from both HE STAs 20 and EHT STAs 20. STAs 20 that are scheduled in the triggering frame may respond with trigger-based PPDUs. In some implementations, an EHT AP 10 may trigger HE STAs 20 (and not EHT STAs 20) by sending an HE triggering frame format. In some implementations, an EHT AP 10 may trigger EHT STAs 20 (and not EHT STAs 20) by sending an HE triggering frame format or an HE triggering frame format including some field or bit allocation adjustments. In some implementations, an EHT AP 10 may trigger EHT STAs 20 and HE STAs 20 by sending an HE triggering frame format including some field or bit allocation adjustments.

The triggering frame 310 may solicit a response from one or more EHT STAs 20 or one or more HE STAs 20, or both.

In some implementations, STAs 20 may not transmit unsolicited uplink transmissions in response to triggering frame 310. In some implementations, triggering frame 310 may solicit an uplink orthogonal frequency division multiple access (OFDMA) transmission or an OFDMA with multi-user multiple-input multiple-output (MU-MIMO) transmission.

Figure 7:
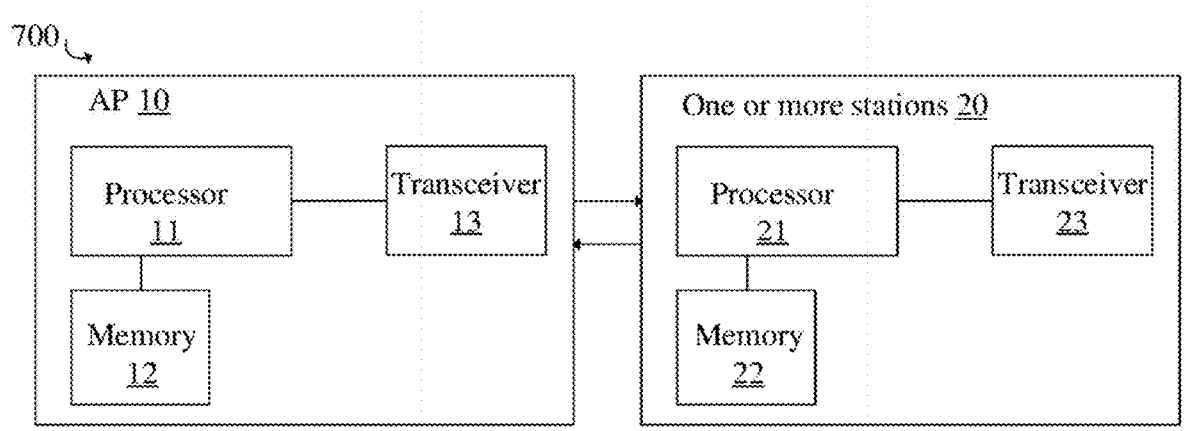
FIG. 7 is a block diagram of one or more stations (STAs) and an access point (AP) of communication in a wireless communications system according to an embodiment of the present disclosure.

FIG. 7 illustrates one or more stations (STAs) 20 and an access point (AP) 10 of communication in a wireless communications system 700 according to an embodiment of the present disclosure. FIG. 7 illustrates that, the wireless communications system 700 includes an access point (AP) 10 and one or more stations (STAs) 20. The AP 10 may include a memory 12, a transceiver 13, and a processor 11 coupled to the memory 12, the transceiver 13. The one or more STAs 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

Figure 8:
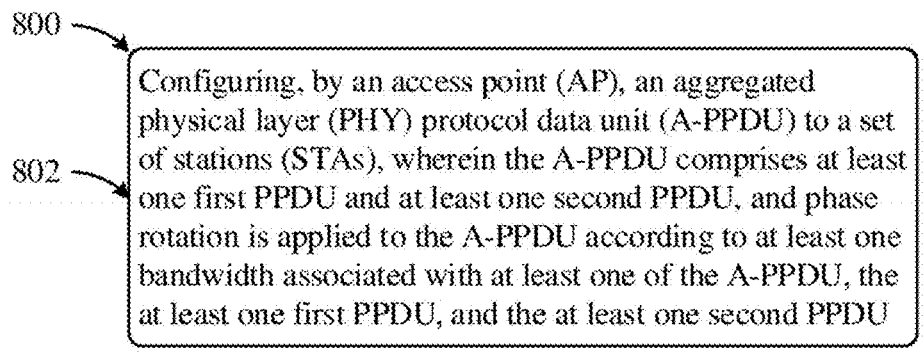
FIG. 8 is a flowchart illustrating a wireless communication method performed by an AP according to an embodiment of the present disclosure.
Figure 9:
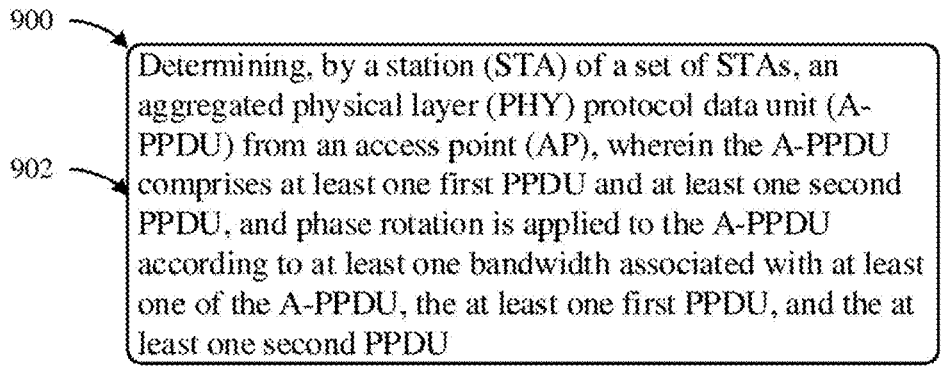
FIG. 9 is a flowchart illustrating a wireless communication method performed by a STA according to another embodiment of the present disclosure.

In some embodiments, the processor 11 is configured to: configure an aggregated physical layer (PHY) protocol data unit (A-PPDU) to a set of stations (STAs) 20, wherein the A-PPDU comprises at least one first PPDU and at least one second PPDU, phase rotation is applied to the A-PPDU according to at least one bandwidth associated with at least one of the A-PPDU, the at least one first PPDU, and the at least one second PPDU. This can solve issues in the prior art, apply phase rotation to an A-PPDU, improve peak-to-average power ratio (PAPR) of the A-PPDU, achieve extremely high throughput (EHT), provide a good communication performance, and/or provide high reliability In some embodiments, the processor 21 is configured to determine an aggregated physical layer (PHY) protocol data unit (A-PPDU) from an access point (AP) 10, wherein the A-PPDU comprises at least one first PPDU and at least one second PPDU, phase rotation is applied to the A-PPDU according to at least one bandwidth associated with at least one of the A-PPDU, the at least one first PPDU, and the at least one second PPDU. This can solve issues in the prior art, apply phase rotation to an A-PPDU, improve peak-to-average power ratio (PAPR) of the A-PPDU, achieve extremely high throughput (EHT), provide a good communication performance, and/or provide high reliability FIG. 8 illustrates a wireless communication method 800 performed by an AP according to an embodiment of the present disclosure. In some embodiments, the method 800 includes: a block 802, configuring, by an access point (AP), an aggregated physical layer (PHY) protocol data unit (A-PPDU) to a set of stations (STAs), wherein the A-PPDU comprises at least one first PPDU and at least one second PPDU, and phase rotation is applied to the A-PPDU according to at least one bandwidth associated with at least one of the A-PPDU, the at least one first PPDU, and the at least one second PPDU. This can solve issues in the prior art, apply phase rotation to an A-PPDU, improve peak-to-average power ratio (PAPR) of the A-PPDU, achieve extremely high throughput (EHT), provide a good communication performance, and/or provide high reliability FIG. 9 illustrates a wireless communication method 900 performed by a STA according to an embodiment of the present disclosure. In some embodiments, the method 900 includes: a block 902, determining, by a station (STA) of a set of STAs, an aggregated physical layer (PHY) protocol data unit (A-PPDU) from an access point (AP), wherein the A-PPDU comprises at least one first PPDU and at least one second PPDU, and phase rotation is applied to the A-PPDU according to at least one bandwidth associated with at least one of the A-PPDU, the at least one first PPDU, and the at least one second PPDU. This can solve issues in the prior art, apply phase rotation to an A-PPDU, improve peak-to-average power ratio (PAPR) of the A-PPDU, achieve extremely high throughput (EHT), provide a good communication performance, and/or provide high reliability In some embodiments, the phase rotation is applied to the A-PPDU according to at least one bandwidth of the at least one first PPDU and at least one bandwidth of the at least one second PPDU. In some embodiments, the phase rotation is applied to the at least one first PPDU according to the at least one bandwidth of the at least one first PPDU and the phase rotation is applied to the at least one second PPDU according to the at least one bandwidth of the at least one second PPDU. In some embodiments, the phase rotation is applied to the A-PPDU according to a bandwidth of the A-PPDU. In some embodiments, the phase rotation is applied to the at least one first PPDU and/or the at least one second PPDU having the same bandwidth as the bandwidth of the A-PPDU. In some embodiments, the phase rotation is applied to the A-PPDU according to a total bandwidth of the at least one first PPDU and the at least one second PPDU. In some embodiments, when the total bandwidth of the at least one first PPDU and the at least one second PPDU is smaller than or equal to a half bandwidth of the A-PPDU, the A-PPDU is treated as a compressed A-PPDU having a bandwidth equal to the half bandwidth of the A-PPDU, and the phase rotation is applied to the compressed A-PPDU. In some embodiments, the phase rotation is applied to the at least one first PPDU and/or the at least one second PPDU having the same bandwidth as the bandwidth of the compressed A-PPDU.

In some embodiments, when the total bandwidth of the at least one first PPDU and the at least one second PPDU is larger than a half bandwidth of the A-PPDU, the phase rotation is applied to the at least one first PPDU and/or the at least one second PPDU having the same bandwidth as the bandwidth of the A-PPDU. In some embodiments, the A-PPDU comprises a frequency-domain (FD) A-PPDU (FD-A-PPDU). In some embodiments, the at least one first PPDU comprises one high efficiency (HE) multi-user (MU) PPDU, and the at least one second PPDU comprises one or two extremely high throughput (EHT) MU PPDUs for downlink transmission. In some embodiments, the at least one first PPDU comprises one HE MU PPDU, and the at least one second PPDU comprises one EHT MU PPDU, and one post-EHT MU PPDU for downlink transmission. In some embodiments, the at least one first PPDU comprises one or more HE trigger-based (TB) PPDUs, and the at least one second PPDU comprises one or more EHT TB PPDUs for uplink transmission. In some embodiments, the at least one first PPDU comprises one or more HE TB PPDUs, and the at least one second PPDU comprises one or more EHT TB PPDUs, and one or more post-EHT TB PPDU for uplink transmission. In some embodiments, a number of first symbols of the at least one first PPDU is equal to a number of second symbols of the at least one second PPDU and/or a first field of the at least one first PPDU has a same symbol duration and/or a same guard interval (GI) duration as a second field of the at least one second PPDU.

In some embodiments, the A-PPDU is configured in a basic service set (BSS) with a first bandwidth. In some embodiments, the BSS comprises an extremely high throughput (EHT) BSS. In some embodiments, the first bandwidth is greater than 80 MHz. In some embodiments, the first bandwidth of the A-PPDU is equal to 160 MHz. In some embodiments, the first bandwidth of the A-PPDU is equal to 320 MHz. In some embodiments, the first symbols comprise HE SIGNAL B field (HE-SIG-B) symbols. In some embodiments, the second symbols comprise EHT SIGNAL field (EHT-SIG) symbols. In some embodiments, the first field comprises a HE Long Training field (HE-LTF). In some embodiments, the second field comprises an EHT-LTF. In some embodiments, a number of HE-LTF symbols is same as or different from a number of EHT-LTF symbols. In some embodiments, when the number of HE-LTF symbols is same as the number of EHT-LTF symbols, each HE-LTF symbol and/or each EHT-LTF symbol has a different duration or a same duration from each data symbol. In some embodiments, each HE-LTF symbol without a GI and/or each EHT-LTF symbol without a GI comprises 3.2 μs or 6.4 μs or 12.8 μs. In some embodiments, when the number of HE-LTF symbols is different from the number of EHT-LTF symbols, each HE-LTF symbol and/or each EHT-LTF symbol has a same duration from each data symbol. In some embodiments, each HE-LTF symbol without a GI and/or each EHT-LTF symbol without a GI comprises 12.8 μs.

In some embodiments, pre-HE modulated fields of the HE MU PPDU and pre-EHT modulated fields of the EHT MU PPDU can be kept orthogonal in frequency domain symbol-by-symbol. In some embodiments, the FD-A-PPDU used for downlink transmission does not comprise a HE single user (SU) PPDU. In some embodiments, pre-HE modulated fields of the HE SU PPDU and pre-EHT modulated fields of the EHT MU PPDU cannot be kept orthogonal in frequency domain symbol-by-symbol. In some embodiments, the FD-A-PPDU used for downlink transmission does not comprise both of a HE extended range (ER) SU PPDU and the EHT MU PPDU. In some embodiments, the A-PPDU used for trigger-based uplink transmission comprises one or more first trigger-based (TB) PPDUs and one or more second TB PPDUs if each first symbol has a same symbol duration and a same GI duration as each second symbol. In some embodiments, one or more first TB PPDUs comprise one or more HE trigger-based (TB) PPDUs and one or more second TB PPDUs comprise one or more EHT TB PPDUs. In some embodiments, pre-HE modulated fields of the first TB PPDU and pre-EHT modulated fields of the second TB PPDU can be kept orthogonal in frequency domain symbol-by-symbol. In some embodiments, the A-PPDU used for trigger-based uplink transmission does not comprise a HE SU PPDU, a HE ER SU PPDU, and/or a HE MU PPDU. In some embodiments, the HE SU PPDU, the HE ER SU PPDU, and/or the HE MU PPDU is disallowed for trigger-based uplink transmission. In some embodiments, the uplink transmission is determined in a first bandwidth channel if the STA is a first type of STA and/or is determined in a second bandwidth channel if the STA is a second type of STA and/or is determined in a third bandwidth channel if the STA is a third type of STA.

In some embodiments, the first type of STA comprises a HE STA, and the first bandwidth channel comprises a primary 80 MHz channel (P80). In some embodiments, the second type of STA comprises an EHT STA, and the second bandwidth channel comprises a non-primary 80 MHz channel and/or the third type of STA comprises a post-EHT STA, and the third bandwidth channel comprises a non-primary 80 MHz channel. In some embodiments, the non-primary 80 MHz channel comprises an 80 MHz frequency segment outside the P80. In some embodiments, the non-primary 80 MHz channel comprises a secondary 80 MHz channel (S80) in a 160 MHz channel or a 320 MHz channel. In some embodiments, for downlink transmission, the HE STA needs to process pre-HE modulated fields of the HE MU PPDU within the P80; while the EHT STA needs to process pre-EHT modulated fields of the EHT MU PPDU within the 80 MHz frequency segment the EHT STA parks. In some embodiments, within each of the P80 and the S80, a single 20 MHz subchannel which is not a primary 20 MHz channel (P20) may be punctured. In some embodiments, an 80 MHz bandwidth (BW) HE MU PPDU to which preamble puncturing may be applied is transmitted in the P80 while an 80 MHz BW EHT MU PPDU to which preamble puncturing may be applied is transmitted in the S80. In some embodiments, within each of the P80 and the S80, two consecutive 20 MHz subchannels which do not include P20 may be punctured. In some embodiments, if the punctured two 20 MHz subchannels constitute a secondary 40 MHz subchannel (S40), a 40 MHz BW HE MU PPDU is transmitted in a primary 40 MHz subchannel (S40). In some embodiments, if the punctured two 20 MHz subchannels cross P40 and S40, an 80 MHz BW HE MU PPDU with preamble puncturing applied is transmitted in P80.

In some embodiments, if the punctured two 20 MHz subchannels constitute a 40 MHz subchannel of S80, a 40 MHz BW EHT MU PPDU is transmitted in the other 40 MHz subchannel of S80. In some embodiments, if the punctured two 20 MHz subchannels cross the two 40 MHz subchannels of S80, an 80 MHz BW EHT MU PPDU with preamble puncturing applied is transmitted in S80. In some embodiments, in a 320 MHz BW FD-A-PPDU, a BW allocated to the at least one HE STA is P80 or primary 160 MHz channel (P160); while a BW allocated to the at least one EHT STA is one of two 80 MHz frequency segments of secondary 160 MHz channel (S160), S160, a combination of S80 and one of two 80 MHz frequency segments of S160, or a combination of S80 and S160. In some embodiments, a number of EHT MU PPDUs in a 320 MHz BW FD-A-PPDU depends on a BW allocation to the at least one EHT STA in the FD-A-PPDU. In some embodiments, when the BW allocated to the at least one EHT STA is one of two 80 MHz frequency segments of S160 or S160, there is a single EHT MU PPDU in the FD-A-PPDU.

In some embodiments, when the BW allocated to the at least one EHT STA is a combination of S80 and one of two 80 MHz frequency segments of S160, there are two EHT MU PPDUs. In some embodiments, when the BW allocated to the at least one EHT STA is a combination of S80 and S160, there is one or two EHT MU PPDUs in the FD-A-PPDU. In some embodiments, for the 320 MHz BW FD-A-PPDU, the BW allocation in the FD-A-PPDU comprises at least one of the following options: option 1A: when S80 is punctured, a BW allocated to the at least one HE STA is P80 and a BW allocated to the at least one EHT STA is S160; option 1B: when one of two 80 MHz frequency segments of S160 is punctured, the BW allocated to the at least one HE STA is P160 and the BW allocated to the at least one EHT STA is the other 80 MHz frequency segment of S160; option 1C: when one of two 80 MHz frequency segments of S160 is punctured, the BW allocated to the at least one HE STA is P80 and the BW allocated to the at least one EHT STA is S80 and the other 80 MHz frequency segment of S160; option 1D: when none of 80 MHz frequency segments is punctured, the BW allocated to the at least one HE STA is P160 and the BW allocated to the at least one EHT STA is S160; or option 1E: when none of 80 MHz frequency segments is punctured, the BW allocated to the at least one HE STA is P80 and the BW allocated to the at least one EHT STA is S80 and S160.

In some embodiments, the 320 MHz BW FD-A-PPDU comprise the HE MU PPDU, the EHT MU PPDU, and a post-EHT MU PPDU. In some embodiments, for the 320 MHz BW FD-A-PPDU, the BW allocation in the FD-A-PPDU comprises at least one of the following options: option 2A: when S80 is punctured, the BW allocated to the at least one HE STA is P80 and BWs allocated to the at least one EHT STA and the at least one post-EHT STA are two 80 MHz frequency segments of S160, respectively; option 2B: when one of two 80 MHz frequency segments of S160 is punctured, the BW allocated to the at least one HE STA is P80 and the BW allocated to the at least one EHT STA and the at least one post-EHT STA are S80 and the other 80 MHz frequency segment of S160, respectively; option 2C: when none of 80 MHz frequency segments is punctured, the BW allocated to the at least one HE STA is P80, the BW allocated to the at least one EHT STA is S160, and the BW allocated to the at least one post-EHT STA is S80; or option 2D: when none of 80 MHz frequency segments is punctured, the BW allocated to the at least one HE STA is P80, the BW allocated to the at least one post-EHT STA is S160, and the BW allocated to the at least one EHT STA is S80. In some embodiments, for trigger-based uplink transmission, the FD-A-PPDU comprises one or more HE TB PPDUs, and one or more EHT TB PPDUs in an EHT BSS and/or the FD-A-PPDU comprises one or more HE TB PPDUs, one or more EHT TB PPDUs, and one or more post-EHT TB PPDUs in a post-EHT BSS.

Formats of HE PPDU and EHT PPDU in a FD-A-PPDU:

According to some embodiments of the present invention, in an EHT BSS with a large BW (e.g. 160 MHz or 320 MHz), a FD-A-PPDU used for downlink transmission may comprise a single HE MU PPDU and one or two EHT MU PPDUs if the number of HE-SIG-B symbols is equal to the number of EHT-SIG symbols and/or the HE-LTF field has a same symbol duration and a same GI duration as the EHT-LTF field.

The number of HE-LTF symbols may be the same as or different from the number of EHT-LTF symbols. When the number of HE-LTF symbols is the same as the number of EHT-LTF symbols, each HE-LTF/EHT-LTF symbol may have a different duration or a same duration from each data symbol. In other words, each HE-LTF/EHT-LTF symbol without GI may be 6.4 us or 12.8 μs. When the number of HE-LTF symbols is different from the number of EHT-LTF symbols, each HE-LTF/EHT-LTF symbol shall have a same duration as each data symbol. In other words, each HE-LTF/EHT-LTF symbol without GI shall be 12.8 µs. As a result, the pre-HE modulated fields of a HE MU PPDU and the pre-EHT modulated fields of an EHT MU PPDU can be kept orthogonal in frequency domain symbol-by-symbol.

According to some embodiments of the present invention, a FD-A-PPDU used for downlink transmission shall not comprise a HE SU PPDU since the pre-HE modulated fields of a HE SU PPDU and the pre-EHT modulated fields of an EHT MU PPDU cannot be kept orthogonal in frequency domain symbol-by-symbol.

According to some embodiments of the present invention, although it is possible to keep the pre-HE modulated fields of a HE ER SU PPDU and the pre-EHT modulated fields of an EHT MU PPDU orthogonal in frequency domain symbol-by-symbol if the number of EHT-SIG symbols is two and each HE-LTF symbol has a same symbol duration and a same GI duration as each EHT-LTF symbol, it does not make sense to enable a FD-A-PPDU comprising a HE ER SU PPDU and an EHT MU PPDU since there is lack of use cases for such a FD-A-PPDU.

According to some embodiments of the present invention, in an EHT BSS with a large BW (e.g. 160 MHz or 320 MHz), a FD-A-PPDU used for trigger-based uplink transmission may comprise one or more HE TB PPDU and one or more EHT TB PPDU if each HE-LTF symbol has a same symbol duration and a same GI duration as each EHT-LTF symbol.

Further, the number of HE-LTF symbols may be the same as or different from the number of EHT-LTF symbols. When the number of HE-LTF symbols is the same as the number of EHT-LTF symbols, each HE-LTF/EHT-LTF symbol may have a different duration or a same duration from each data symbol. In other words, each HE-LTF/EHT-LTF symbol without GI may be 3.2 µs, 6.4 µs or 12.8 µs. When the number of HE-LTF symbols is different from the number of EHT-LTF symbols, each HE-LTF/EHT-LTF symbol shall have a same duration as each data symbol. In other words, each HE-LTF/EHT-LTF symbol without GI shall be 12.8 µs. As a result, the pre-HE modulated fields of a HE TB PPDU and the pre-EHT modulated fields of an EHT TB PPDU can be kept orthogonal in frequency domain symbol-by-symbol.

According to some embodiments of the present invention, a FD-A-PPDU used for trigger-based uplink transmission shall not comprise a HE SU PPDU, a HE ER SU PPDU or a HE MU PPDU since they are disallowed for trigger-based uplink transmission.

Bandwidth allocation in a FD-A-PPDU:

For downlink transmission, a HE STA only needs to process the pre-HE modulated fields of a HE MU PPDU within primary 80 MHz channel (P80); while an EHT STA only needs to process the pre-EHT modulated fields of an EHT MU PPDU within an 80 MHz frequency segment it parks. As a result, for a FD-A-PPDU comprising a HE PPDU and one or two EHT PPDUs, each intended HE STA shall park in P80 while each intended EHT STA shall park in one of non-primary 80 MHz channel(s) via an enhanced SST (subchannel selective transmission) operation mechanism. A non-primary 80 MHz channel is an 80 MHz frequency segment outside P80, e.g. secondary 80 MHz channel (S80) in a 160 MHz or 320 MHz channel.

Figure 10:
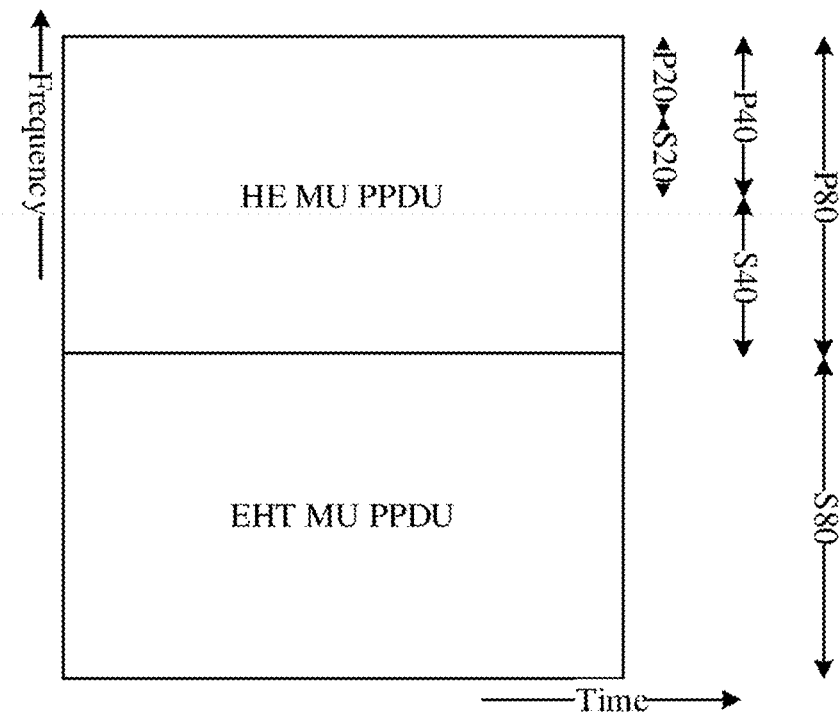
FIG. 10 is a schematic diagram illustrating an example of 160 MHz BW FD-A-PPDU according to an embodiment of the present disclosure.

FIG. 10 illustrates an example of 160 MHz BW FD-A-PPDU according to an embodiment of the present disclosure. According to some embodiments of the present invention, for a 160 MHz BW FD-A-PPDU as illustrated in FIG. 10, BW allocated to HE STAs is P80 while BW allocated to EHT STAs is S80. Each intended HE STA shall park in P80 while each intended EHT STA shall park in S80. Within each of P80 and S80, in one embodiment, a single 20 MHz subchannel which is not P20 may be punctured. In this case, an 80 MHz BW HE MU PPDU to which preamble puncturing may be applied is transmitted in P80 while an 80 MHz BW EHT MU PPDU to which preamble puncturing may be applied is transmitted in S80.

In another embodiment, two consecutive 20 MHz subchannels which do not include P20 may be punctured. In this case, if the punctured two 20 MHz subchannels constitute secondary 40 MHz subchannel (S40), a 40 MHz BW HE MU PPDU is transmitted in P40. If the punctured two 20 MHz subchannels cross P40 and S40, an 80 MHz BW HE MU PPDU with preamble puncturing applied is transmitted in P80. On the other hand, if the punctured two 20 MHz subchannels constitute a 40 MHz subchannel of S80, a 40 MHz BW EHT MU PPDU is transmitted in the other 40 MHz subchannel of S80. If the punctured two 20 MHz subchannels cross the two 40 MHz subchannels of S80, an 80 MHz BW EHT MU PPDU with preamble puncturing applied is transmitted in S80.

According to some embodiments of the present invention, in a 320 MHz BW FD-A-PPDU, the BW allocated to HE STAs is P80 or primary 160 MHz channel (P160); while the BW allocated to EHT STAs is one of two 80 MHz frequency segments of secondary 160 MHz channel (S160), S160, a combination of S80 and one of two 80 MHz frequency segments of S160 or a combination of S80 and S160. The number of EHT MU PPDUs in a 320 MHz BW FD-A-PPDU depends on how the BW is allocated to EHT STAs in the FD-A-PPDU. When the BW allocated to EHT STAs is one of two 80 MHz frequency segments of S160 or S160, there is a single EHT MU PPDU in the FD-A-PPDU. When the BW allocated to EHT STAs is a combination of S80 and one of two 80 MHz frequency segments of S160, there are two EHT MU PPDUs in the FD-A-PPDU. When the BW allocated to EHT STAs is a combination of S80 and S160, there is one or two EHT MU PPDUs in the FD-A-PPDU.

Figure 11A:
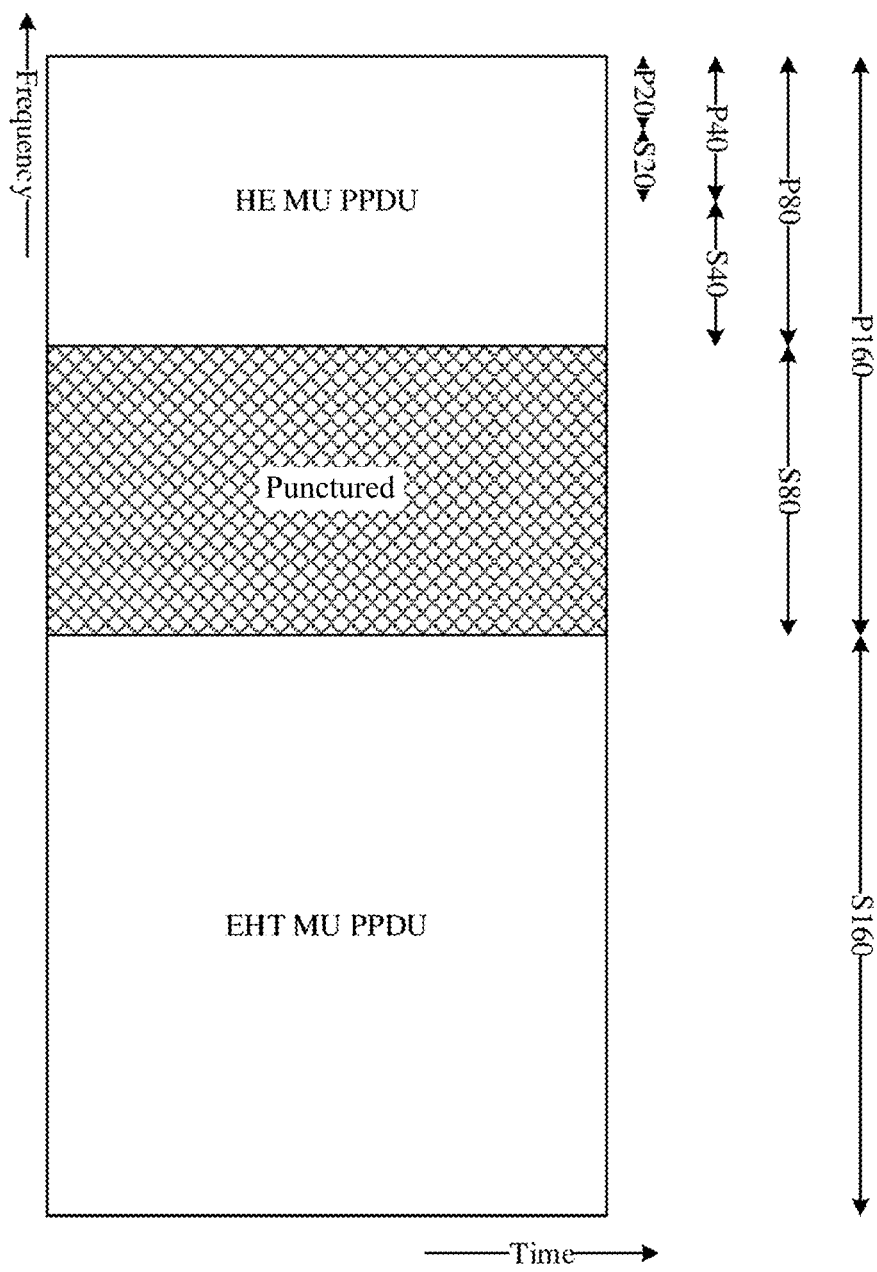
FIG. 11A is a schematic diagram illustrating an example of 320 MHz BW FD-A-PPDU in an EHT basic service set (BSS) for option 1A according to an embodiment of the present disclosure.

According to some embodiments of the present invention, for a 320 MHz BW FD-A-PPDU, there may have the following five options for BW allocation in the FD-A-PPDU:

Option 1A: When S80 is punctured, BW allocated to HE STAs is P80 and BW allocated to EHT STAs is S160, as illustrated in FIG. 11A.

Figure 11B:
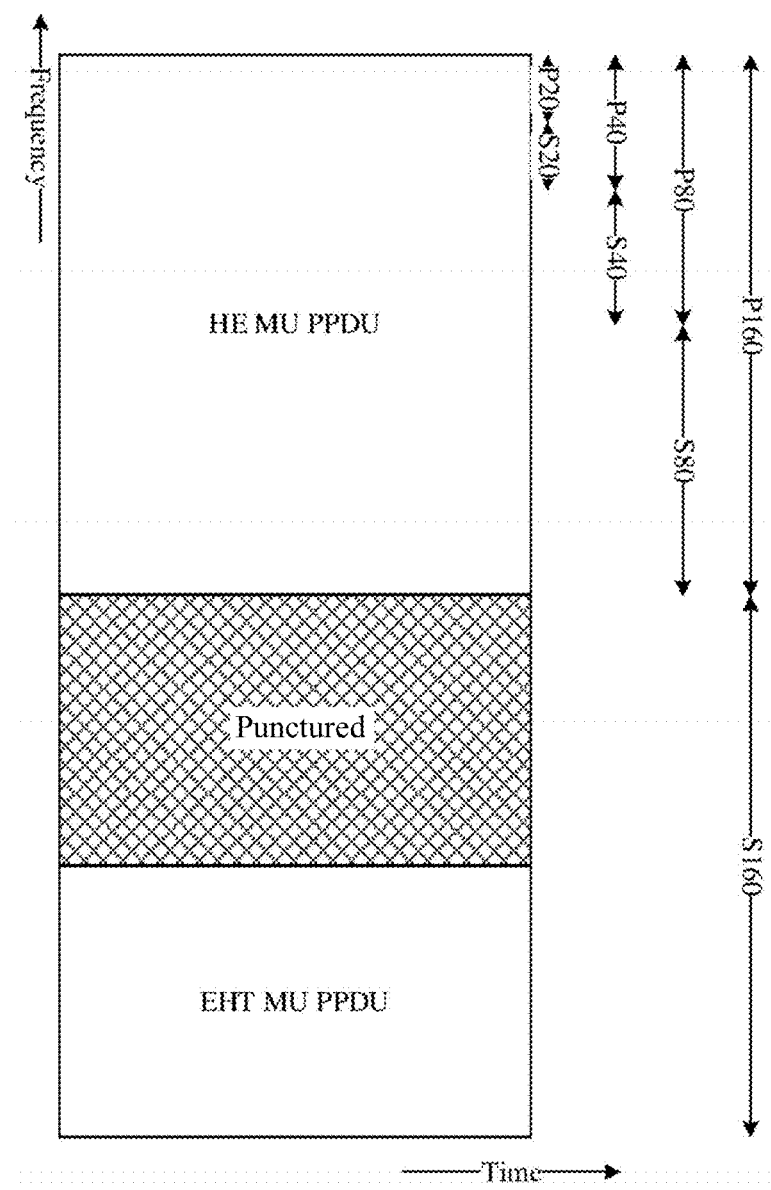
FIG. 11B is a schematic diagram illustrating an example of 320 MHz BW FD-A-PPDU in an EHT BSS for option 1B according to an embodiment of the present disclosure.

Option 1B: When one of two 80 MHz frequency segments of S160 is punctured, BW allocated to HE STAs is P160 and BW allocated to EHT STAs is the other 80 MHz frequency segment of S160, as illustrated in FIG. 11B.

Figure 11C:
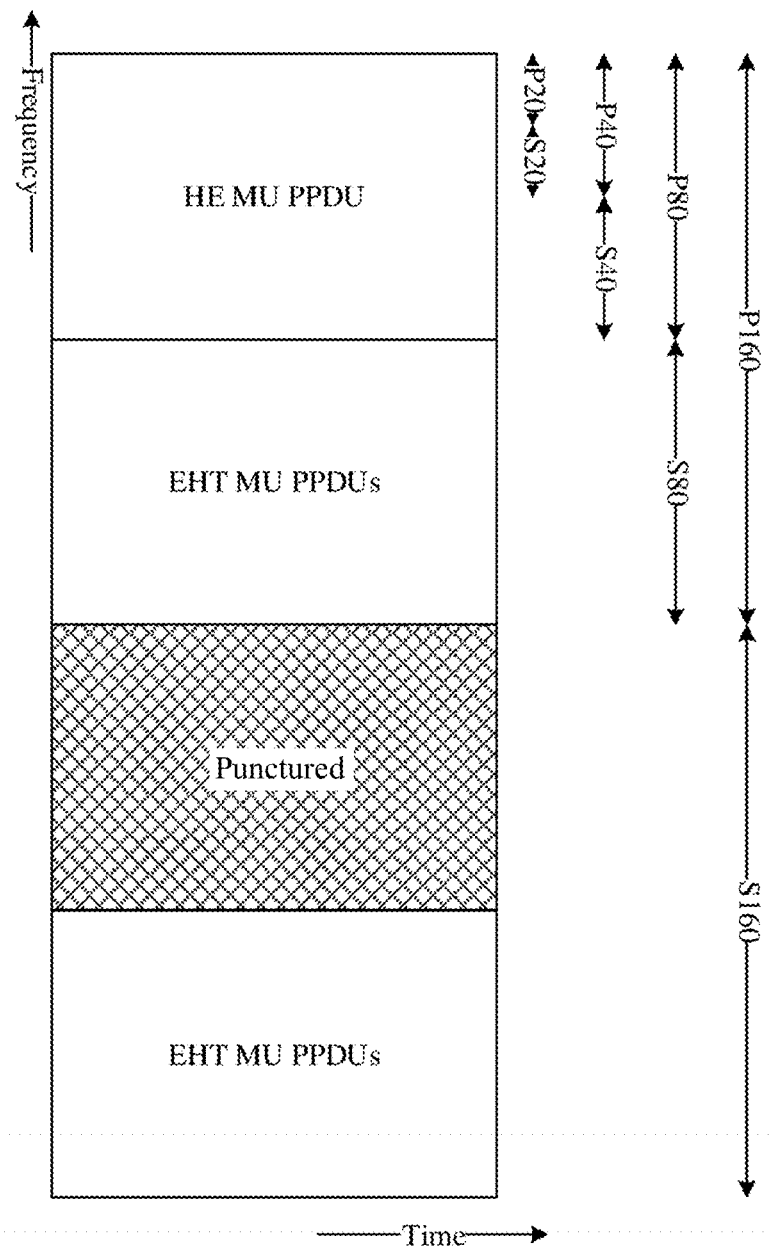
FIG. 11C is a schematic diagram illustrating an example of 320 MHz BW FD-A-PPDU in an EHT BSS for option 1C according to an embodiment of the present disclosure.

Option 1C: When one of two 80 MHz frequency segments of S160 is punctured, BW allocated to HE STAs is P80 and BW allocated to EHT STAs is S80 and the other 80 MHz frequency segment of S160, as illustrated in FIG. 11C.

Figure 11D:
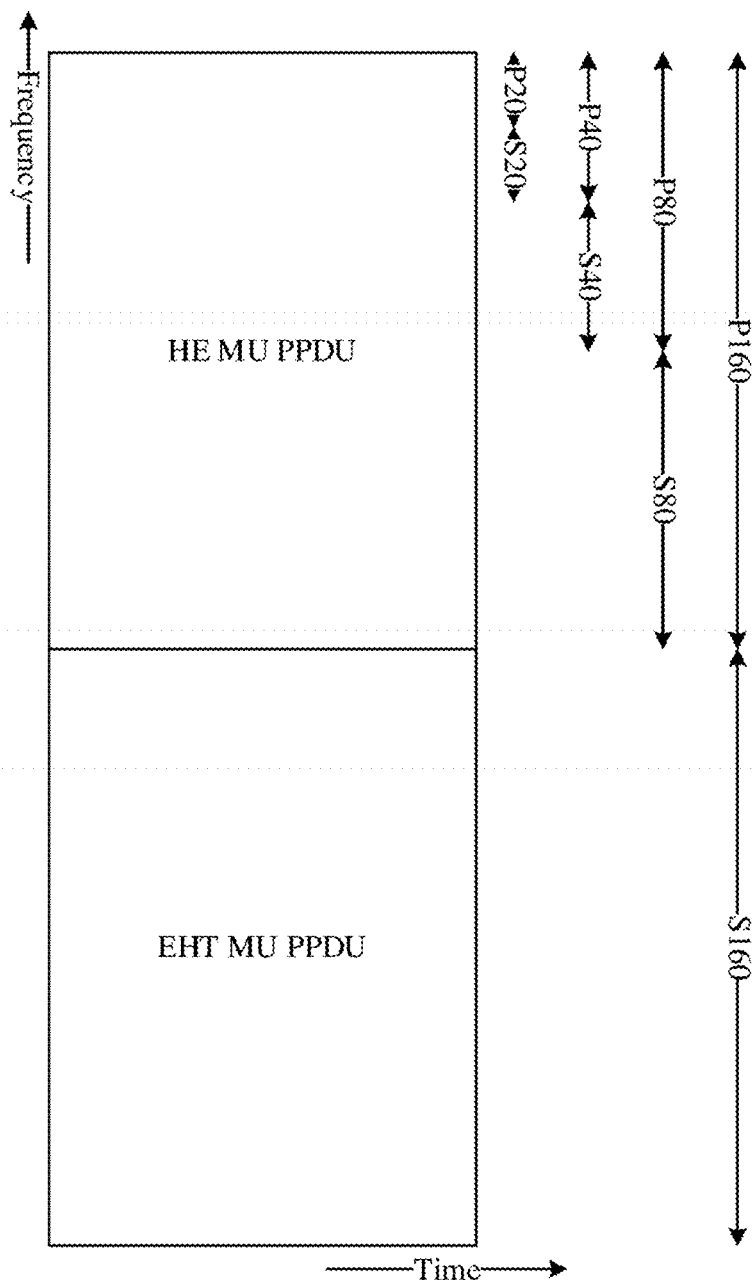
FIG. 11D is a schematic diagram illustrating an example of 320 MHz BW FD-A-PPDU in an EHT BSS for option 1D according to an embodiment of the present disclosure.

Option 1D: When none of 80 MHz frequency segments is punctured, BW allocated to HE STAs is P160 and BW allocated to EHT STAs is S160, as illustrated in FIG. 11D.

Figure 11E:
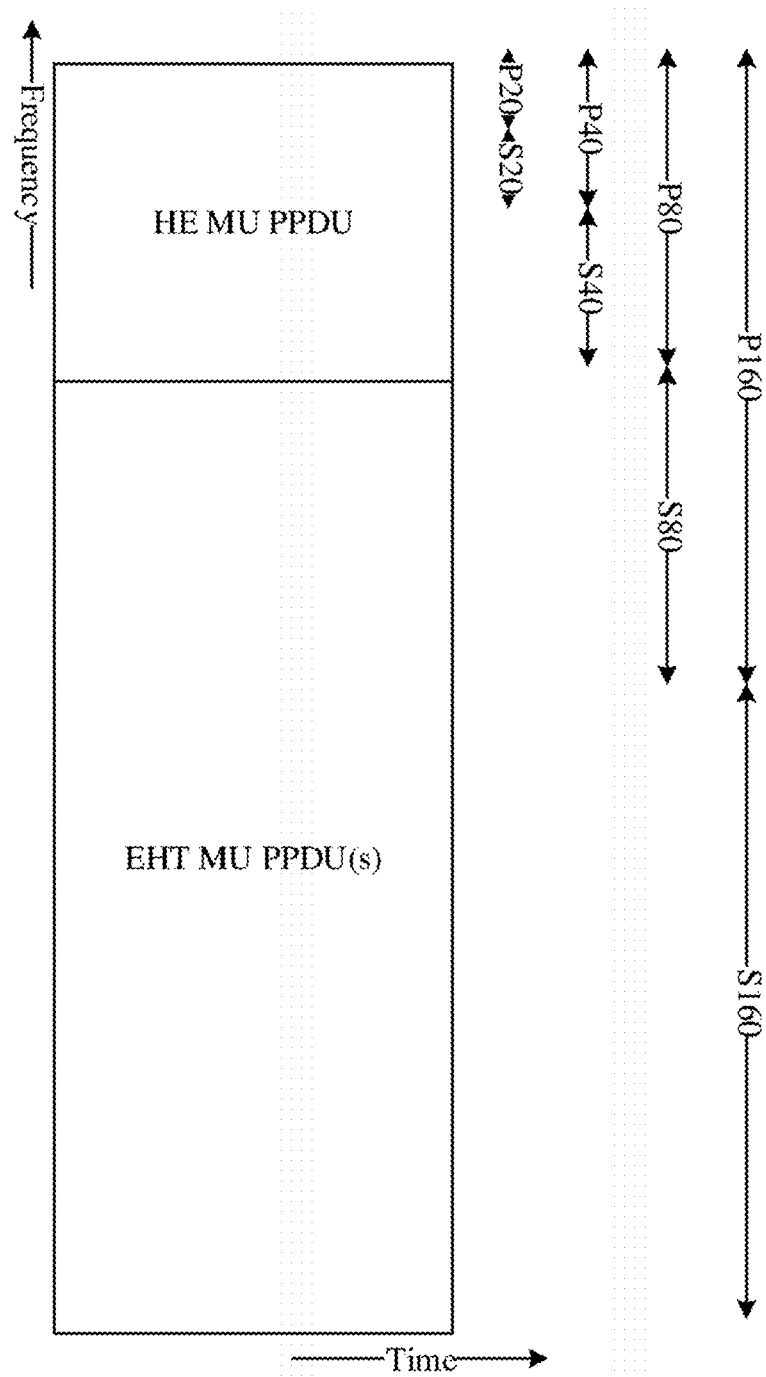
FIG. 11E is a schematic diagram illustrating an example of 320 MHz BW FD-A-PPDU in an EHT BSS for option 1E according to an embodiment of the present disclosure.

Option 1E: When none of 80 MHz frequency segments is punctured, BW allocated to HE STAs is P80 and BW allocated to EHT STAs is S80 and S160, as illustrated in FIG. 11E.

Option 1B is typically applicable to use cases where more HE STAs than EHT STAs exist in an EHT BSS, which may occur when EHT STAs start shipping to markets. Option 1D is typically applicable to use cases where similar number of HE STAs and EHT STAs exist in an EHT BSS. Option 1A, Option 1C and Option 1E are typically applicable to use cases where more EHT STAs than HE STAs exist in an EHT BSS, which may occur when EHT STAs dominate Wi-Fi markets.

According to some embodiments of the present invention, regarding Option 1A for a 320 MHz BW FD-A-PPDU, each intended HE STA shall park in P80 while each intended EHT STA shall park in one of two 80 MHz frequency segments of S160. Within P80 or each of the two 80 MHz frequency segments of S160, in one embodiment, a single 20 MHz subchannel which is not P20 may be punctured. In this case, an 80 MHz BW HE MU PPDU to which preamble puncturing may be applied is transmitted in P80 while a 160 MHz BW EHT MU PPDU to which preamble puncturing may be applied is transmitted in S160.

In another embodiment, within P80 or each of the two 80 MHz frequency segments of S160, two consecutive 20 MHz subchannels which do not include P20 may be punctured. In this case, if the punctured two 20 MHz subchannels constitute S40, a 40 MHz BW HE MU PPDU is transmitted in P40. If the punctured two 20 MHz subchannels cross P40 and S40, an 80 MHz BW HE MU PPDU with preamble puncturing applied is transmitted in P80. On the other hand, a 160 MHz BW EHT MU PPDU to which preamble puncturing may be applied is transmitted in S160.

According to some embodiments of the present invention, regarding Option 1B for a 320 MHz BW FD-A-PPDU, each intended HE STA shall park in P80 while each intended EHT STA shall park in the unpunctured 80 MHz frequency segment of S160. Within P80, S80 or the unpunctured 80 MHz frequency segment of S160, in one embodiment, a single 20 MHz subchannel which is not P20 may be punctured. In this case, a 160 MHz BW HE MU PPDU to which preamble puncturing may be applied is transmitted in P160 while an 80 MHz BW EHT MU PPDU to which preamble puncturing may be applied is transmitted in the unpunctured 80 MHz frequency segment of S160.

In another embodiment, within P80, S80 or the unpunctured 80 MHz frequency segment of S160, two consecutive 20 MHz subchannels which do not include P20 may be punctured. In this case, a 160 MHz BW HE MU PPDU to which preamble puncturing may be applied is transmitted in P160. On the other hand, if the punctured two 20 MHz subchannels constitute one 40 MHz subchannel of the unpunctured 80 MHz frequency segment of S160, a 40 MHz BW EHT MU PPDU is transmitted in the other 40 MHz subchannel of the unpunctured 80 MHz frequency segment of S160. If the punctured two 20 MHz subchannels cross the two 40 MHz subchannels of the unpunctured 80 MHz frequency segment of S160, an 80 MHz BW EHT MU PPDU with preamble puncturing applied is transmitted in the unpunctured 80 MHz frequency segment of S160.

According to some embodiments of the present invention, regarding Option 1C for a 320 MHz BW FD-A-PPDU, each intended HE STA shall park in P80 while each intended EHT STA shall park in S80 or the unpunctured 80 MHz frequency segment of S160. Within P80, S80 or the unpunctured 80 MHz frequency segment of S160, in one embodiment, a single 20 MHz subchannel which is not P20 may be punctured. In this case, an 80 MHz BW HE MU PPDU to which preamble puncturing may be applied is transmitted in P80. On the other hand, an 80 MHz BW EHT MU PPDU to which preamble puncturing may be applied is transmitted in S80 and another 80 MHz BW EHT MU PPDU to which preamble puncturing may be applied is transmitted in the unpunctured 80 MHz frequency segment of S160.

In another embodiment, within P80, S80 or the unpunctured 80 MHz frequency segment of S160, two consecutive 20 MHz subchannels which do not include P20 may be punctured. In this case, if the punctured two 20 MHz subchannels constitute S40, a 40 MHz BW HE MU PPDU is transmitted in P40. If the punctured two 20 MHz subchannels cross P40 and S40, an 80 MHz BW HE MU PPDU with preamble puncturing applied is transmitted in P80. On the other hand, if the punctured two 20 MHz subchannels constitute one 40 MHz subchannel of S80, a 40 MHz BW EHT MU PPDU is transmitted in the other 40 MHz subchannel of S80. If the punctured two 20 MHz subchannels cross two 40 MHz subchannels of S80, an 80 MHz BW EHT MU PPDU with preamble puncturing applied is transmitted in S80. If the punctured two 20 MHz subchannels constitute one 40 MHz subchannel of the unpunctured 80 MHz frequency segment of S160, another 40 MHz BW EHT MU PPDU is transmitted in the other 40 MHz subchannel of the unpunctured 80 MHz frequency segment of S160. If the punctured two 20 MHz subchannels cross two 40 MHz subchannels of the unpunctured 80 MHz frequency segment of S160, another 80 MHz BW EHT MU PPDU with preamble puncturing applied is transmitted in the unpunctured 80 MHz frequency segment of S160.

According to some embodiments of the present invention, regarding Option 1D for a 320 MHz BW FD-A-PPDU, each intended HE STA shall park in P80 while each intended EHT STA shall park in one of two 80 MHz frequency segments of S160. Within P80, S80 or each of the two 80 MHz frequency segments of S160, in one embodiment, a single 20 MHz subchannel which is not P20 may be punctured. In this case, a 160 MHz BW HE MU PPDU to which preamble puncturing may be applied is transmitted in P160. On the other hand, a 160 MHz BW EHT MU PPDU to which preamble puncturing may be applied is transmitted in S160.

In another embodiment, within P80, S80 or each of the two 80 MHz frequency segments of S160, two consecutive 20 MHz subchannels which do not include P20 may be punctured. In this case, a 160 MHz BW HE MU PPDU to which preamble puncturing may be applied is transmitted in P160. On the other hand, a 160 MHz BW EHT MU PPDU to which preamble puncturing may be applied is transmitted in S160.

According to some embodiments of the present invention, regarding Option 1E for a 320 MHz BW FD-A-PPDU, each intended HE STA shall park in P80 while each intended EHT STA shall park in S80 or one of two 80 MHz frequency segments of S160. Within P80, S80 or each of the two 80 MHz frequency segments of S160, in one embodiment, a single 20 MHz subchannel which is not P20 may be punctured. In this case, an 80 MHz BW HE MU PPDU to which preamble puncturing may be applied is transmitted in P80. On the other hand, a 320 MHz BW EHT MU PPDU with preamble puncturing applied is transmitted in S80 and S160. Alternatively, an 80 MHz BW EHT MU PPDU to which preamble puncturing may be applied is transmitted in S80 and another 160 MHz BW EHT MU PPDU to which preamble puncturing may be applied is transmitted in S160. Compared to a 320 MHz BW EHT MU PPDU transmitted in S80 and S160, two separate 80 MHz and 160 MHz BW EHT MU PPDUs transmitted in S80 and S160 may result in lower EHT-SIG overhead. However, in two separate 80 MHz and 160 MHz BW EHT MU PPDUs transmitted in S80 and S160, EHT STAB intended by the 80 MHz BW EHT MU PPDU transmitted in S80 cannot be scheduled in S160, vice versa, which reduces scheduling flexibility.

In another embodiment, within P80, S80 or each of the two 80 MHz frequency segments of S160, two consecutive 20 MHz subchannels which do not include P20 may be punctured. In this case, if the punctured two 20 MHz subchannels constitute S40, a 40 MHz BW HE MU PPDU is transmitted in P40. If the punctured two 20 MHz subchannels cross P40 and S40, an 80 MHz BW HE MU PPDU with preamble puncturing applied is transmitted in P80. On the other hand, a 320 MHz BW EHT MU PPDU with preamble puncturing applied is transmitted in S80 and S160. Alternatively, if the punctured two 20 MHz subchannels constitute one 40 MHz subchannel of S80, a 40 MHz BW EHT MU PPDU is transmitted in the other 40 MHz subchannel of S80. If the punctured two 20 MHz subchannels cross two 40 MHz subchannels of S80, an 80 MHz BW EHT MU PPDU with preamble puncturing applied is transmitted in S80. If the punctured two 20 MHz subchannels constitute one 40 MHz subchannel of the unpunctured 80 MHz frequency segment of S160, a 40 MHz BW EHT MU PPDU is transmitted in the other 40 MHz subchannel of the unpunctured 80 MHz frequency segment of S160. If the punctured two 20 MHz subchannels cross two 40 MHz subchannels of the unpunctured 80 MHz frequency segment of S160, an 80 MHz BW EHT MU PPDU with preamble puncturing applied is transmitted in the unpunctured 80 MHz frequency segment of S160.

Figure 12A:
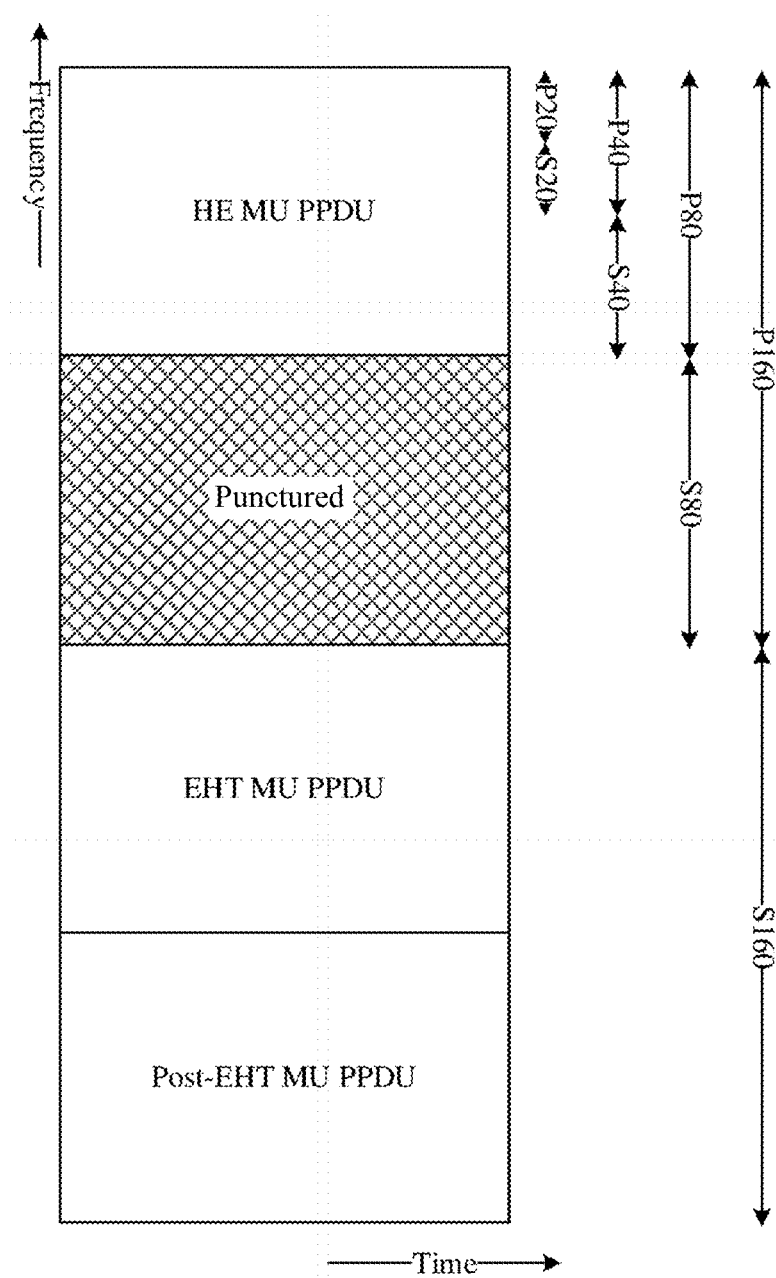
FIG. 12A is a schematic diagram illustrating an example of 320 MHz BW FD-A-PPDU in a post-EHT BSS for option 2A according to an embodiment of the present disclosure.

Post-EHT WLAN will be the next-generation WLAN immediately after EHT WLAN. According to some embodiments of the present invention, HE STAs, EHT STAs, and post-EHT STAs may coexist in a post-EHT BSS in future. To improve system throughput in a post-EHT BSS, a 320 MHz BW FD-A-PPDU may comprise a HE MU PPDU, an EHT MU PPDU and a post-EHT MU PPDU regardless of how BW is allocated to HE STAs, EHT STAs and post-EHT STAs. There may have the following four options for BW allocation in a 320 MHz FD-A-PPDU:

Option 2A: When S80 is punctured, BW allocated to HE STAs is P80 and BW allocated to EHT STAs and post-EHT STAs are two 80 MHz frequency segments of S160, respectively, as illustrated in FIG. 12A.

Figure 12B:
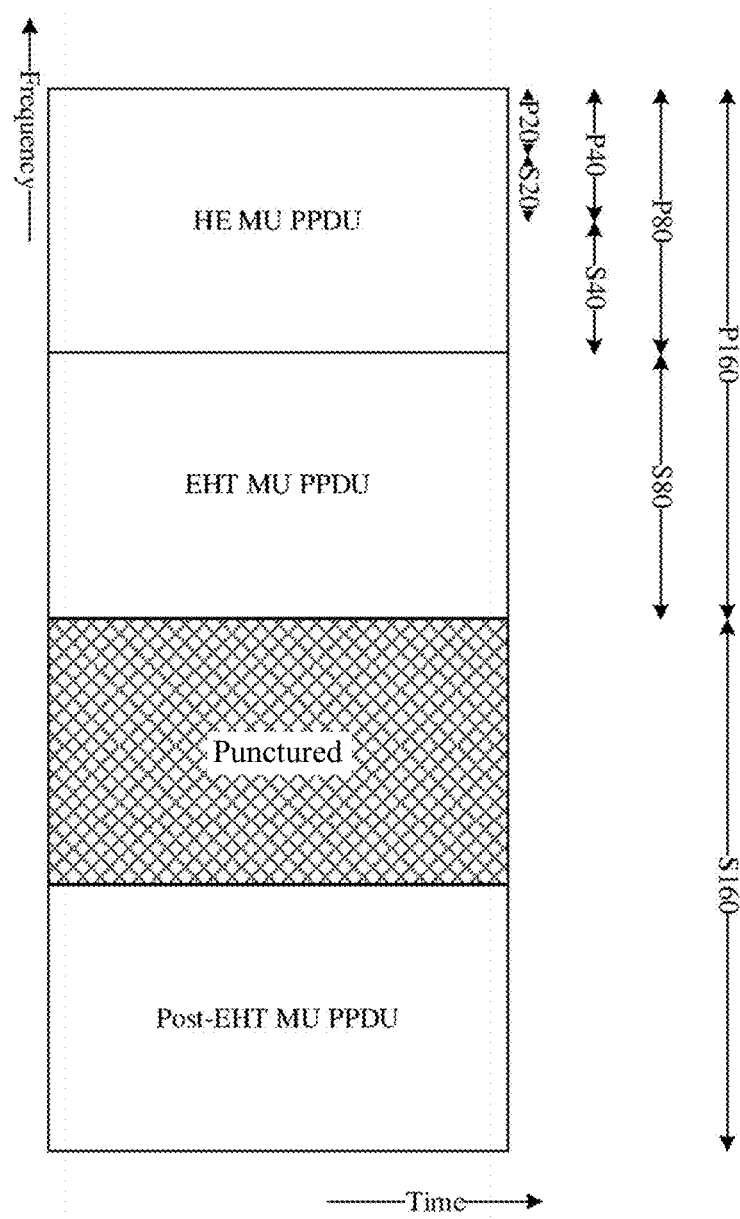
FIG. 12B is a schematic diagram illustrating an example of 320 MHz BW FD-A-PPDU in a post-EHT BSS for option 2B according to an embodiment of the present disclosure.

Option 2B: When one of two 80 MHz frequency segments of S160 is punctured, BW allocated to HE STAs is P80 and BW allocated to EHT STAs and post-EHT STAs are S80 and the other 80 MHz frequency segment of S160, respectively, as illustrated in FIG. 12B.

Figure 12C:
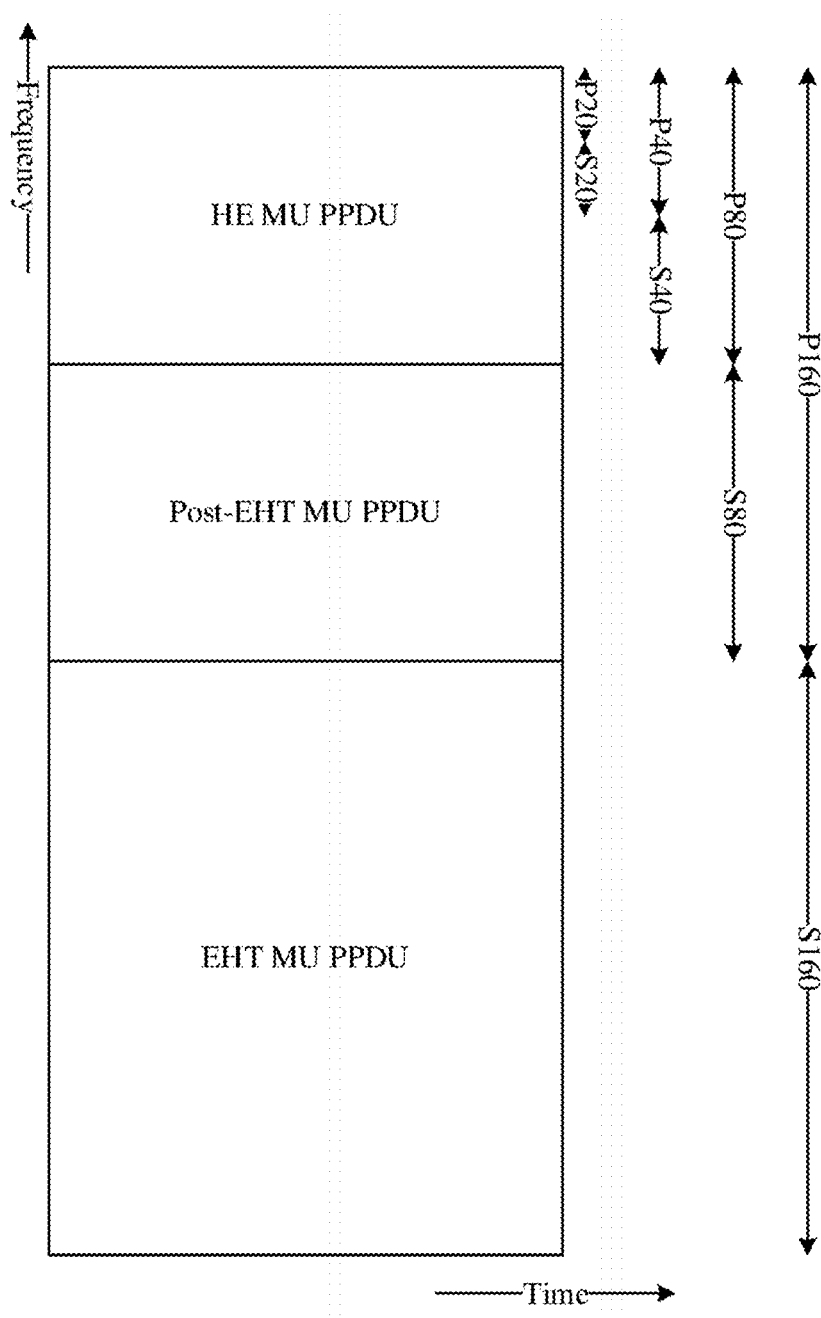
FIG. 12C is a schematic diagram illustrating an example of 320 MHz BW FD-A-PPDU in a post-EHT BSS for option 2C according to an embodiment of the present disclosure.

Option 2C: When none of 80 MHz frequency segments is punctured, BW allocated to HE STAs is P80, BW allocated to EHT STAs is S160, and BW allocated to post-EHT STAs is S80, as illustrated in FIG. 12C.

Figure 12D:
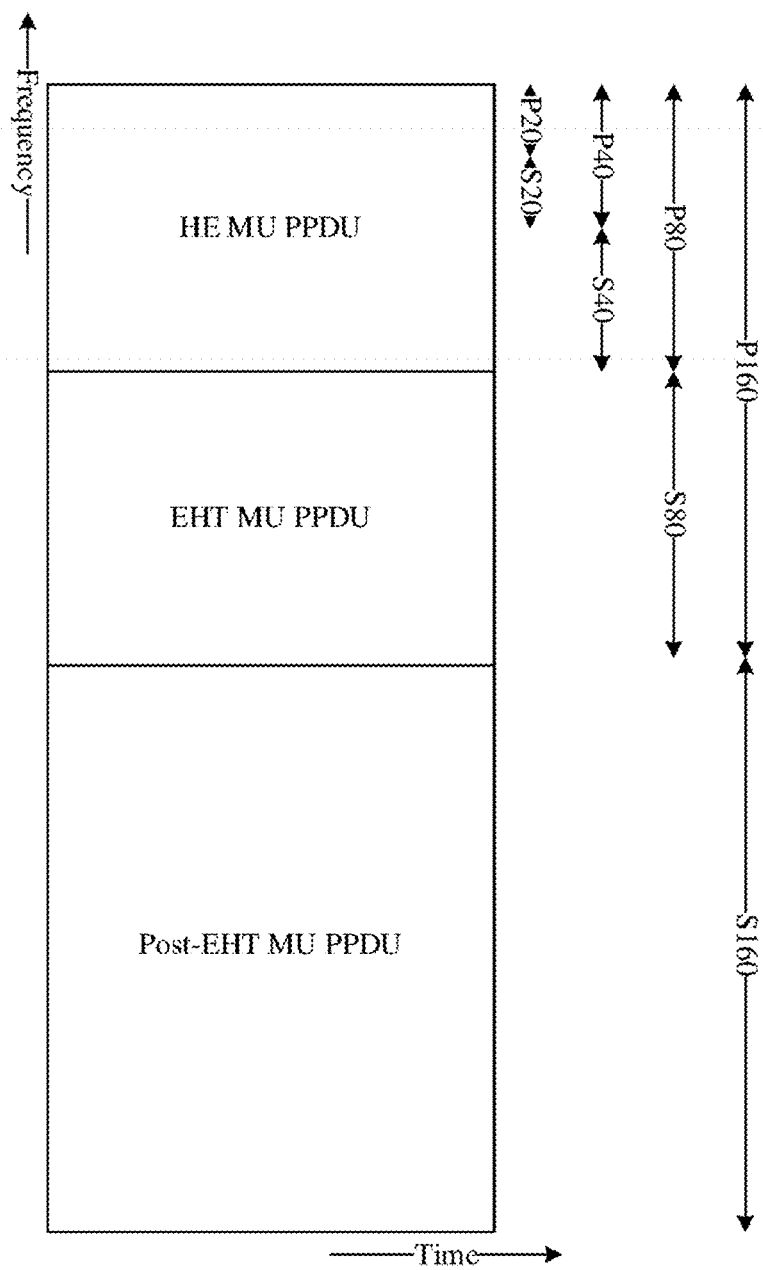
FIG. 12D is a schematic diagram illustrating an example of 320 MHz BW FD-A-PPDU in a post-EHT BSS for option 2D according to an embodiment of the present disclosure.

Option 2D: When none of 80 MHz frequency segments is punctured, BW allocated to HE STAs is P80, BW allocated to post-EHT STAs is S160, and BW allocated to EHT STAs is S80, as illustrated in FIG. 12D.

It can be expected that when post-EHT STAs start shipping to markets, EHT STAs will dominate Wi-Fi markets and HE STAs will gradually fade out. According to the present invention, in a FD-A-PPDU, BW allocated to HE STAs shall not be larger than that allocated to EHT STAs or post-EHT STAs. Option 2C is typically applicable to use cases where more EHT STAs than post-EHT STAs and HE STAs exist in a post-EHT BSS, which may occur when post-EHT STAs just start shipping to markets. Option 2A and Option 2B are typically applicable to use cases where similar number of HE STAs, EHT STAs and post-EHT STAs exist in a post-EHT BSS. Option 2D is typically applicable to use cases where more post-EHT STAs than HE STAs and EHT-STAs exist in a post-EHT BSS, which may occur when post-EHT STAs dominate Wi-Fi markets.

According to some embodiments of the present invention, for trigger-based uplink transmission, a FD-A-PPDU may comprise one or more HE TB PPDUs and one or more EHT TB PPDUs in an EHT BSS. A FD-A-PPDU may comprise one or more HE TB PPDUs, one or more EHT TB PPDUs and one or more post-EHT TB PPDUs in a post-EHT BSS. For trigger-based uplink transmission in an EHT BSS, BW can be allocated to HE STAs and EHT STAs in a FD-A-PPDU in a similar manner to downlink transmission as illustrated in FIG. 11A to FIG. 11E. For trigger-based uplink transmission in a post-EHT BSS, BW can be allocated to HE STAs, EHT STAs and post-EHT STAs in a FD-A-PPDU in a similar manner to downlink transmission as illustrated in FIG. 12A to FIG. 12D.

In summary, some embodiments of the present disclosure address formats of HE PPDU and EHT PPDU as well as BW allocation in a FD-A-PPDU. According to some embodiments of the present disclosure, a FD-A-PPDU may comprise a HE MU PPDU and one or two EHT MU PPDUs for downlink transmission if the number of HE-SIG-B symbols is equal to the number of EHT-SIG symbols and the HE-LTF field has a same symbol duration and a same GI duration as the EHT-LTF field. When the number of HE-LTF symbols is different from the number of EHT-LTF symbols, each HE-LTF/EHT-LTF symbol shall have a same duration as each data symbol. In a 320 MHz BW FD-A-PPDU, the BW allocated to HE STAs is primary 80 MHz channel (P80) or primary 160 MHz channel (P160); while the BW allocated to EHT STAs is one of two 80 MHz frequency segments of secondary 160 MHz channel (S160), S160, a combination of secondary 80 MHz channel (S80) and one of two 80 MHz frequency segments of S160 or a combination of S80 and S160. The number of EHT MU PPDUs in a 320 MHz BW FD-A-PPDU depends on how the BW is allocated to EHT STAs in the FD-A-PPDU. When the BW allocated to EHT STAs is one of two 80 MHz frequency segments of S160 or S160, there is a single EHT MU PPDU in the FD-A-PPDU. When the BW allocated to EHT STAs is a combination of S80 and one of two 80 MHz frequency segments of S160, there are two EHT MU PPDUs in the FD-A-PPDU. When the BW allocated to EHT STAs is a combination of S80 and S160, there is one or two EHT MU PPDUs in the FD-A-PPDU.

According to some embodiments of the present disclosure, in a FD-A-PPDU, the BW can be allocated to HE STAs and EHT STAs flexibly according to the number of HE STAs and EHT STAs in an EHT BSS. Further, in a FD-A-PPDU, one or two EHT MU PPDUs can be transmitted according to the tradeoff between scheduling flexibility and overhead reduction. As a result, system throughput in the EHT BSS can be improved as much as possible.

Phase rotation in a FD-A-PPDU:

Example

In some embodiments, how phase rotation is applied to a FD-A-PPDU comprising one HE MU PPDU and one or two EHT MU PPDUs depends on respective BWs of the HE MU PPDU and the one or two EHT MU PPDUs and is regardless of the BW of the FD-A-PPDU. Phase rotation is separately applied to each of one HE MU PPDU and one or two EHT MU PPDUs in a FD-A-PPDU according to their respective BWs.

Figure 13:
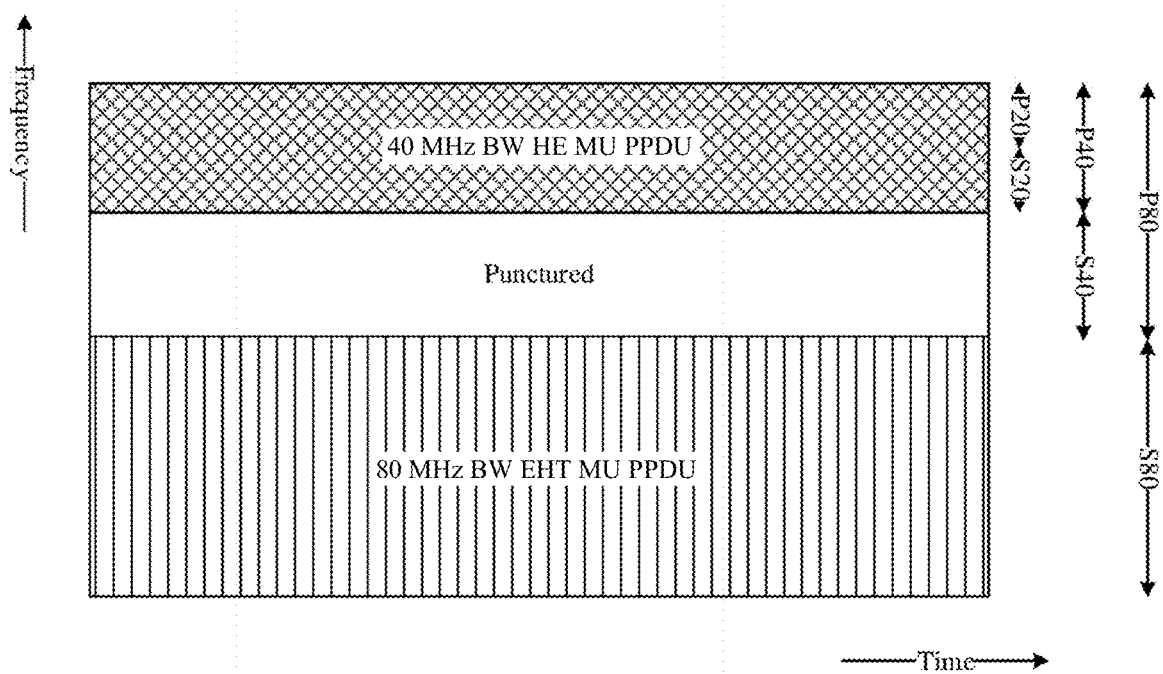
FIG. 13 is a schematic diagram illustrating an example of 160 MHz BW FD-A-PPDU according to an embodiment of the present disclosure.

FIG. 13 illustrates an example of 160 MHz BW FD-A-PPDU according to an embodiment of the present disclosure. For one example, a 160 MHz BW FD-A-PPDU may comprise a 40 MHz BW HE MU PPDU and an 80 MHz BW EHT MU PPDU as illustrated in FIG. 13. In this example, according to some embodiments, phase rotation applied to the 40 MHz BW HE MU PPDU is given by:

$$Y_{k,40}^{HE} = \begin{cases} 1, & k < 0 \\ j, & k \geq 0 \end{cases} \quad (6)$$

k is the tone index with respect to the 40 MHz BW HE or EHT PPDU and k∈[−64, 63]. On the other hand, phase rotation applied to the 80 MHz BW EHT MU PPDU is given by:

$$Y_{k,80}^{EHT} = \begin{cases} 1, & k < -64 \\ -1, & k \geq -64 \end{cases} \quad (7)$$

k is the tone index with respect to the 80 MHz BW HE or EHT PPDU and k∈[−128, 127].

Figure 14:
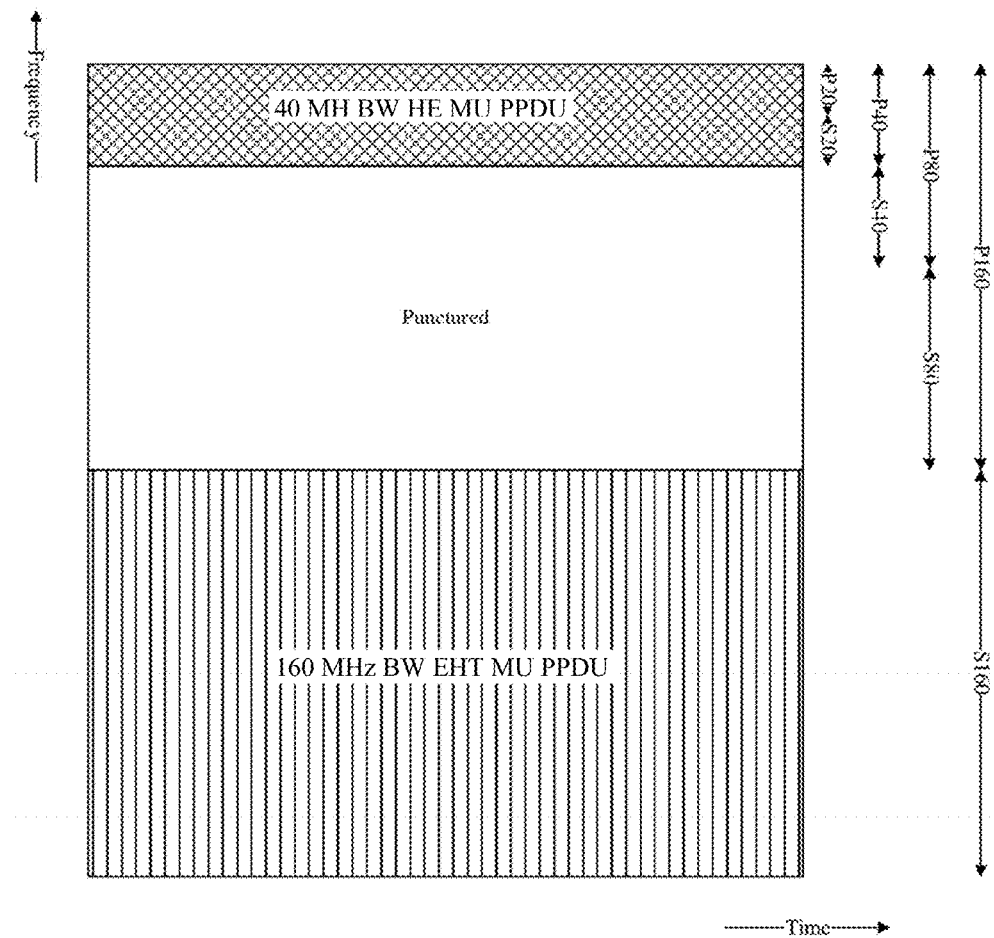
FIG. 14 is a schematic diagram illustrating an example of 320 MHz BW FD-A-PPDU according to an embodiment of the present disclosure.

FIG. 14 illustrates an example of 320 MHz BW FD-A-PPDU according to an embodiment of the present disclosure. For another example, a 320 MHz BW FD-A-PPDU may comprise a 40 MHz BW HE MU PPDU and a 160 MHz BW EHT MU PPDU as illustrated in FIG. 14. In this example, according to some embodiments, phase rotation applied to the 40 MHz BW HE MU PPDU is given by:

$$Y_{k,40}^{HE} = \begin{cases} 1, & k < 0 \\ j, & k \geq 0 \end{cases} \quad (8)$$

k is the tone index with respect to the 40 MHz BW HE or EHT PPDU and k∈[−64, 63]. On the other hand, phase rotation applied to the 160 MHz BW EHT MU PPDU is given by:

$$Y_{k,160}^{EHT} = \begin{cases} 1, & k < -192 \\ -1, & -192 \leq k < 0 \\ 1, & 0 \leq k < 64 \\ -1, & k \geq 64 \end{cases} \quad (9)$$

k is the tone index with respect to the 160 MHz BW HE or MU PPDU and k∈[−256, 255].

Example

In some embodiments, how phase rotation is applied to a FD-A-PPDU comprising one HE MU PPDU and one or two EHT MU PPDUs depends on the FD-A-PPDU's BW. Phase rotation is applied to a FD-A-PPDU in a similar manner to a HE or EHT PPDU which has the same BW as the FD-A-PPDU. For the example 160 MHz BW FD-A-PPDU as illustrated in FIG. 13, according to some embodiments, phase rotation applied to the 80 MHz BW EHT MU PPDU is given by:

$$Y_{k,160}^{EHT} = \begin{cases} 1, & k < -192 \\ -1, & -192 \leq k < 0 \end{cases} \quad (10)$$

On the other hand, phase rotation applied to the 40 MHz BW HE MU PPDU is given by:

$$Y_{k,320}^{HE} = -1, k \geq 128 \quad (11)$$

k is the tone index with respect to the 160 MHz BW HE or EHT PPDU, k∈[−256, −1] corresponds to the 80 MHz BW EHT MU PPDU, k∈[128, 255] corresponds to the 40 MHz BW HE MU PPDU and k∈[0, 127] corresponds to the punctured 40 MHz subchannel.

For the example 320 MHz BW FD-A-PPDU as illustrated in FIG. 14, according to some embodiments, phase rotation applied to the 160 MHz BW EHT MU PPDU is given by:

$$Y_{k,320}^{EHT} = \begin{cases} 1, & k < -448 \\ -1, & -448 \leq k < -256 \\ 1, & -256 \leq k < -192 \\ -1, & -192 \leq k < 0 \end{cases} \quad (12)$$

On the other hand, phase rotation applied to the 40 MHz BW HE MU PPDU is given by:

$$Y_{k,320}^{HE} = 1, k \geq 384 \quad (13)$$

k is the tone index with respect to the 320 MHz BW EHT PPDU, k∈[−512, −1] corresponds to the 160 MHz BW EHT MU PPDU, k∈[384, 511] corresponds to the 40 MHz BW HE MU PPDU and k∈[0, 383] corresponds to the punctured S40 and S80.

Example

Figure 15:
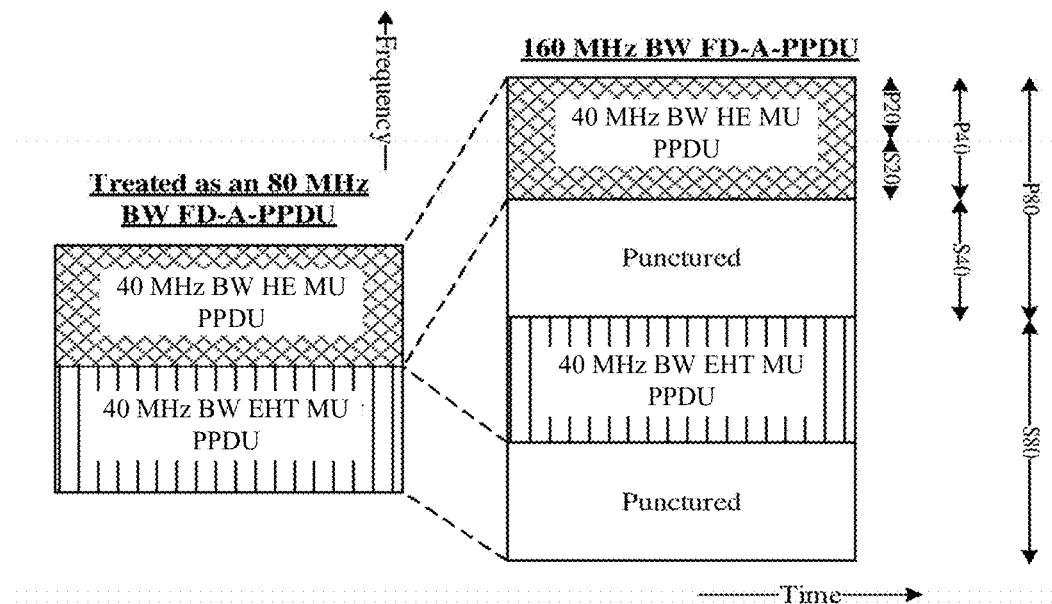
FIG. 15 is a schematic diagram illustrating an example of 160 MHz BW FD-A-PPDU according to an embodiment of the present disclosure.
Figure 16:
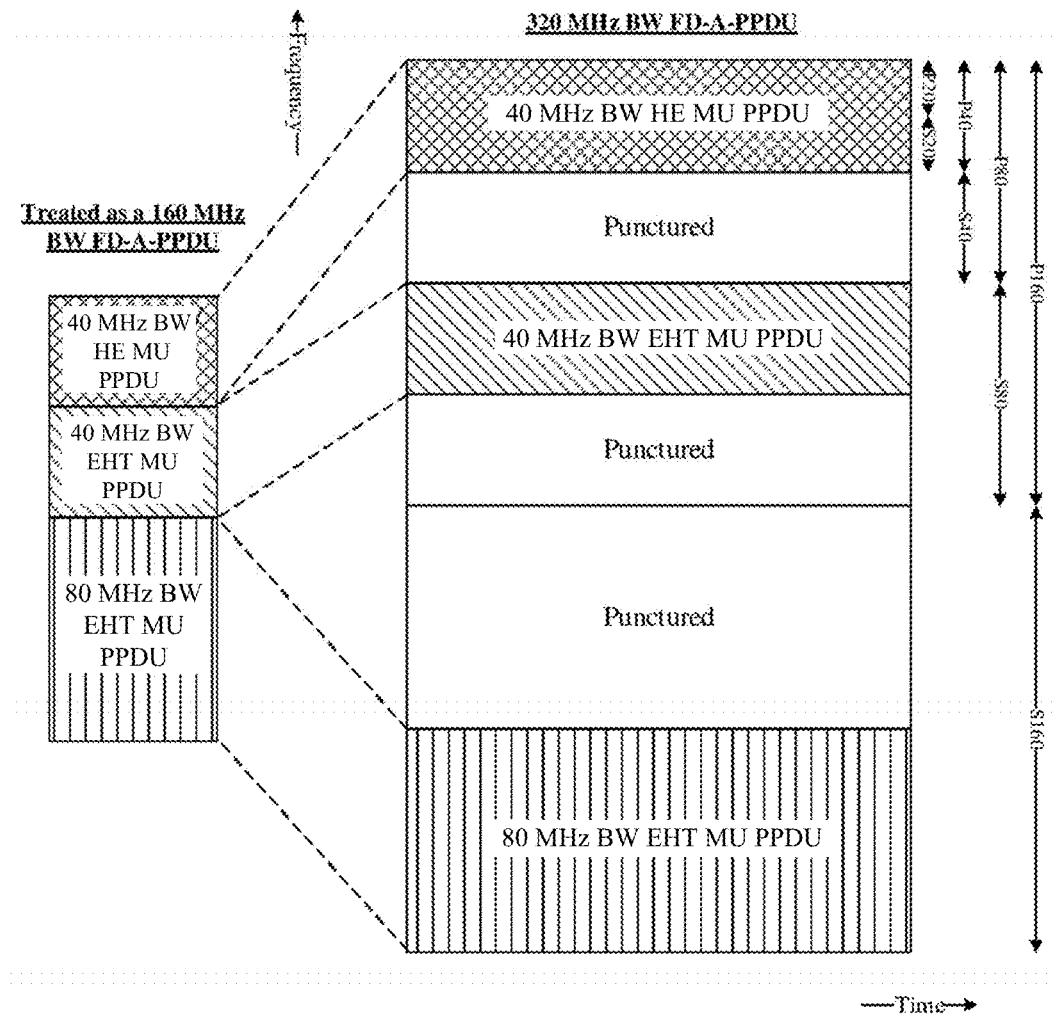
FIG. 16 is a schematic diagram illustrating an example of 320 MHz BW FD-A-PPDU according to an embodiment of the present disclosure.

In some embodiments, how phase rotation is applied to a FD-A-PPDU comprising one HE MU PPDU and one or two EHT MU PPDUs depends on the total BW of the one HE MU PPDU and one or two EHT MU PPDUs in the FD-A-PPDU. When the total BW of the one HE MU PPDU and one or two EHT MU PPDUs in the FD-A-PPDU is smaller than or equal to a half of the FD-A-PPDU's BW, the FD-A-PPDU can be treated as if it is a compressed FD-A-PPDU with a BW equal to a half of the FD-A-PPDU's BW by ignoring all or a part of punctured subchannels in the FD-A-PPDU and then phase rotation is applied to the compressed FD-A-PPDU in a similar manner to an HE or EHT PPDU which has a BW equal to the compressed FD-A-PPDU's BW. FIG. 15 illustrates an example of 160 MHz BW FD-A-PPDU according to an embodiment of the present disclosure. For one example, a 160 MHz BW FD-A-PPDU as illustrated in FIG. 15 may comprise one 40 MHz BW HE MU PPDU and one 40 MHz BW EHT MU PPDU. According to some embodiments, this 160 MHz BW FD-A-PPDU can be treated as it is an 80 MHz BW FD-A-PPDU by ignoring two punctured 40 MHz subchannels. FIG. 16 illustrates an example of 320 MHz BW FD-A-PPDU according to an embodiment of the present disclosure. For another example, a 320 MHz BW FD-A-PPDU as illustrated in FIG. 16 may comprise one 40 MHz BW HE MU PPDU, one 40 MHz BW EHT MU PPDU and one 80 MHz BW EHT MU PPDU. According to some embodiments, this 320 MHz BW FD-A-PPDU can be treated as it is a 160 MHz BW FD-A-PPDU by ignoring two punctured 40 MHz subchannels and one punctured 80 MHz subchannel. On the other hand, when the total BW of the one HE MU PPDU and one or two EHT MU PPDUs in the FD-A-PPDU is larger than a half of the FD-A-PPDU's BW, phase rotation is applied to the FD-A-PPDU in a similar manner to an HE or EHT PPDU which has a BW equal to the FD-A-PPDU's BW.

For the example 160 MHz BW FD-A-PPDU as illustrated in FIG. 13, the total BW of one 40 MHz HE MU PPDU and one 80 MHz BW EHT MU PPDU is 120 MHz, which is larger than a half of the FD-A-PPDU's BW. Consequently, according to some embodiments, phase rotation is applied to the 160 MHz BW FD-A-PPDU in a similar manner to a 160

MHz BW HE or EHT PPDU, as shown in Equations (10) and (11). For the example 160 MHz BW FD-A-PPDU as illustrated in FIG. 15, the total BW of one 40 MHz BW HE MU PPDU and one 40 MHz BW EHT MU PPDU is 80 MHz, which is equal to a half of the FD-A-PPDU's BW. As a result, according to some embodiments, the 160 MHz BW FD-A-PPDU can be treated as if it is an 80 MHz BW FD-A-PPDU and then phase rotation is applied to the 80 MHz BW FD-A-PPDU in a similar manner to an 80 MHz BW HE or EHT PPDU, where phase rotation applied to the 40 MHz BW EHT MU PPDU is given by:

$$Y_{k,80}^{EHT} = \begin{cases} 1, & k < -64 \\ -1, & -64 \leq k < 0 \end{cases} \quad (14)$$

On the other hand, phase rotation applied to the 40 MHz BW HE MU PPDU is given by:

$$Y_{k,80}^{HE} = -1, k \geq 0 \quad (15)$$

k is the tone index with respect to the 80 MHz BW HE or EHT PPDU, $k \in [-128, -1]$ corresponds to the 40 MHz BW EHT MU PPDU and $k \in [0, 127]$ corresponds to the 40 MHz BW HE MU PPDU.

For the example 320 MHz BW FD-A-PPDU as illustrated in FIG. 14, the total BW of one 40 MHz HE MU PPDU and one 160 MHz BW EHT MU PPDU is 200 MHz, which is larger than a half of the FD-A-PPDU's BW. Consequently, according to some embodiments, phase rotation is applied to the 320 MHz BW FD-A-PPDU in a similar manner to a 320 MHz BW EHT PPDU, as shown in Equations (12) and (13).

For the example 320 MHz BW FD-A-PPDU as illustrated in FIG. 16, the total BW of one 40 MHz BW HE MU PPDU, one 40 MHz BW EHT MU PPDU and one 80 MHz BW EHT MU PPDU is 160 MHz, which is equal to a half of the FD-A-PPDU's BW. As a result, according to some embodiments, the 320 MHz BW FD-A-PPDU can be treated as if it is a 160 MHz FD-A-PPDU and then phase rotation is applied to the 160 MHz BW FD-A-PPDU in a similar manner to a 160 MHz BW HE or EHT PPDU, where phase rotation applied to the 80 MHz BW EHT MU PPDU is given by:

$$Y_{k,160}^{EHT} = \begin{cases} 1, & k < -192 \\ -1, & -192 \leq k < 0 \end{cases} \quad (16)$$

Phase rotation applied to the 40 MHz BW EHT MU PPDU is given by:

$$Y_{k,160}^{EHT} = \begin{cases} 1, & 0 \leq k < 64 \\ -1, & 64 \leq k < 128 \end{cases} \quad (17)$$

On the other hand, phase rotation applied to the 40 MHz BW HE MU PPDU is given by:

$$Y_{k,160}^{HE} = -1, 128 \leq k < 256 \quad (18)$$

k is the tone index with respect to the 160 MHz BW HE or EHT PPDU, $k \in [-256, -1]$ corresponds to the 80 MHz BW EHT MU PPDU, $k \in [0, 127]$ corresponds to the 40 MHz BW EHT MU PPDU and $k \in [128, 255]$ corresponds to the 40 MHz BW HE MU PPDU.

In some embodiments, post-EHT WLAN will be the next-generation WLAN immediately after EHT WLAN. According to some embodiments of the present invention, HE STAs, EHT STAs and post-EHT STAs may coexist in a post-EHT BSS in future. To improve system throughput in a post-EHT BSS, a 320 MHz BW FD-A-PPDU may comprise a HE MU PPDU, an EHT MU PPDU, and a post-EHT MU PPDU regardless of how BW is allocated to HE STAs, EHT STAs and post-EHT STAs. Phase rotation can be applied to a 320 MHz FD-A-PPDU comprising one HE MU PPDU, one EHT MU PPDU and one post-EHT MU PPDU in a similar manner to a 320 MHz FD-A-PPDU comprising one HE MU PPDU and one or two EHT MU PPDUs.

According to some embodiments of the present invention, for trigger-based uplink transmission, a FD-A-PPDU may comprise one or more HE TB PPDUs and one or more EHT TB PPDUs in an EHT BSS. A FD-A-PPDU may comprise one or more HE TB PPDUs, one or more EHT TB PPDUs, and one or more post-EHT TB PPDUs in a post-EHT BSS. For trigger-based uplink transmission in an EHT BSS, phase rotation can be applied to a FD-A-PPDU comprising one or more HE TB PPDUs and one or more EHT TB PPDUs in a similar manner to a FD-A-PPDU comprising one HE MU PPDU and one or two EHT MU PPDUs. For trigger-based uplink transmission in a post-EHT BSS, phase rotation can be applied to a 320 MHz BW FD-A-PPDU comprising one or more HE TB PPDUs, one or more EHT TB PPDUs and one or more post-EHT TB PPDUs in a similar manner to a 320 MHz BW FD-A-PPDU comprising one HE MU PPDU, one EHT MU PPDU, and one post-EHT MU PPDU.

In summary, some embodiments of the present disclosure address how phase rotation is applied to a FD-A-PPDU. According to some embodiments of the present invention, a FD-A-PPDU may comprise a HE MU PPDU and one or two EHT MU PPDUs for downlink transmission. In an embodiment, how phase rotation is applied to a FD-A-PPDU comprising one HE MU PPDU and one or two EHT MU PPDUs depends on respective BWs of the HE MU PPDU and one or two EHT MU PPDUs and is regardless of the BW of the FD-A-PPDU. Phase rotation is separately applied to each of one HE MU PPDU and one or two EHT MU PPDUs in a FD-A-PPDU according to their respective BWs. In an embodiment, how phase rotation is applied to a FD-A-PPDU comprising one HE MU PPDU and one or two EHT MU PPDUs depends on the FD-A-PPDU's BW. Phase rotation is applied to a FD-A-PPDU in a similar manner to a HE or EHT PPDU which has a same BW as the FD-A-PPDU. In an embodiment, how phase rotation is applied to a FD-A-PPDU comprising one HE MU PPDU and one or two EHT MU PPDUs depends on the total BW of the one HE MU PPDU and one or two EHT MU PPDUs in the FD-A-PPDU. When the total BW of the one HE MU PPDU and one or two EHT MU PPDUs in the FD-A-PPDU is smaller than or equal to a half of the FD-A-PPDU's BW, the FD-A-PPDU can be treated as if it is a compressed FD-A-PPDU with a BW equal to a half of the FD-A-PPDU's BW by ignoring all or a part of punctured subchannels in the FD-A-PPDU and then phase rotation is applied to the compressed FD-A-PPDU in a similar manner to an HE or EHT PPDU which has a BW equal to the compressed FD-A-PPDU's BW. On the other hand, when the total BW of the one HE MU PPDU and one or two EHT MU PPDUs in the FD-A-PPDU is larger than a half of the FD-A-PPDU's BW, phase rotation is applied to the FD-A-PPDU in a similar manner to an HE or EHT PPDU which has a BW equal to the FD-A-PPDU's BW. According to some embodiments of the present invention, PAPR of a FD-A-PPDU can be minimized.

Compared with the above embodiments, in some embodiments, phase rotation applied to one HE MU PPDU and one or two EHT MU PPDUs in a FD-A-PPDU takes into account the whole FD-A-PPDU's BW, which may result in lower PAPR of the FD-A-PPDU. In addition, applying phase rotation to one HE MU PPDU and one or two EHT MU PPDUs in a FD-A-PPDU according to the above embodiments does not pose any adverse impact on receiver performance of intended HE STAs and EHT STAs since phase rotation applied to one HE MU PPDU and one or two EHT MU PPDUs in a FD-A-PPDU is transparent to the receivers of intended HE STAs and EHT STAs.

Commercial interests for some embodiments are as follows. 1. Solving issues in the prior art. 2. Applying phase rotation to an A-PPDU. 3. Improving peak-to-average power ratio (PAPR) of the A-PPDU. 4. Achieving extremely high throughput (EHT). 5. Improving system throughput in an EHT BSS. 6. Providing a good communication performance. 7. Providing a high reliability. 8. Some embodiments of the present disclosure are used by chipset vendors, communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in communication specification and/or communication standards such as IEEE specification and/or to standards create an end product. Some embodiments of the present disclosure propose technical mechanisms.

Figure 17:
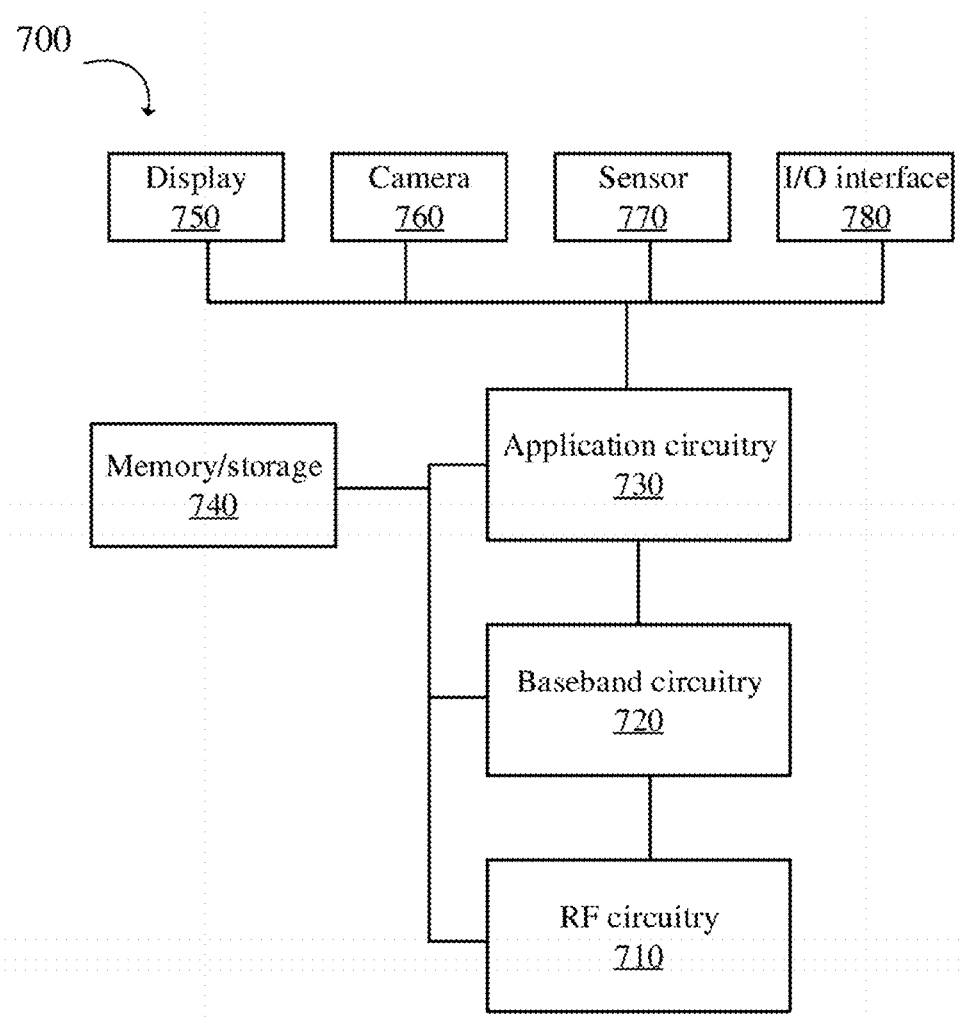
FIG. 17 is a block diagram of a system for wireless communication according to an embodiment of the present disclosure.

FIG. 17 is a block diagram of an example system 700 for wireless communication according to an embodiment of the present disclosure. Embodiments described herein may be implemented into the system using any suitably configured hardware and/or software. FIG. 17 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the AP or STA may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method, comprising:
   configuring, by an access point (AP), an aggregated physical layer (PHY) protocol data unit (A-PPDU) to a set of stations (STAs), wherein the A-PPDU comprises at least one first PPDU and at least one second PPDU, and phase rotation is applied to the A-PPDU according to at least one bandwidth associated with at least one of the A-PPDU, the at least one first PPDU, and the at least one second PPDU;
   wherein one of the following:
      the at least one first PPDU comprises one high efficiency (HE) multi-user (MU) PPDU, and the at least one second PPDU comprises one or two extremely high throughput (EHT) MU PPDUs for downlink transmission;
      the at least one first PPDU comprises one HE MU PPDU, and the at least one second PPDU comprises one EHT MU PPDU, and one post-EHT MU PPDU for downlink transmission;
      the at least one first PPDU comprises one or more HE trigger-based (TB) PPDUs, and the at least one second PPDU comprises one or more EHT TB PPDUs for uplink transmission; and
      the at least one first PPDU comprises one or more HE TB PPDUs, and the at least one second PPDU comprises one or more EHT TB PPDUs, and one or more post-EHT TB PPDU for uplink transmission.

2. The wireless communication method of claim 1, wherein the phase rotation is applied to the A-PPDU according to at least one bandwidth of the at least one first PPDU and at least one bandwidth of the at least one second PPDU,
   wherein the phase rotation is applied to the at least one first PPDU according to the at least one bandwidth of the at least one first PPDU and the phase rotation is applied to the at least one second PPDU according to the at least one bandwidth of the at least one second PPDU.

3. The wireless communication method of claim 1, wherein the phase rotation is applied to the A-PPDU according to a bandwidth of the A-PPDU,
   wherein the phase rotation is applied to the at least one first PPDU and/or the at least one second PPDU having the same bandwidth as the bandwidth of the A-PPDU.

4. The wireless communication method of claim 1, wherein the phase rotation is applied to the A-PPDU according to a total bandwidth of the at least one first PPDU and the at least one second PPDU.

5. The wireless communication method of claim 4, wherein when the total bandwidth of the at least one first PPDU and the at least one second PPDU is smaller than or equal to a half bandwidth of the A-PPDU, the A-PPDU is treated as a compressed A-PPDU having a bandwidth equal to the half bandwidth of the A-PPDU, and the phase rotation is applied to the compressed A-PPDU,
   wherein the phase rotation is applied to the at least one first PPDU and/or the at least one second PPDU having the same bandwidth as the bandwidth of the compressed A-PPDU.

6. The wireless communication method of claim 4, wherein when the total bandwidth of the at least one first PPDU and the at least one second PPDU is larger than a half bandwidth of the A-PPDU, the phase rotation is applied to the at least one first PPDU and/or the at least one second PPDU having the same bandwidth as the bandwidth of the A-PPDU.

7. The wireless communication method of claim 1, wherein the A-PPDU comprises a frequency-domain (FD) A-PPDU (FD-A-PPDU).

8. A wireless communication method, comprising:
determining, by a station (STA) of a set of STAs, an aggregated physical layer (PHY) protocol data unit (A-PPDU) from an access point (AP), wherein the A-PPDU comprises at least one first PPDU and at least one second PPDU, and phase rotation is applied to the A-PPDU according to at least one bandwidth associated with at least one of the A-PPDU, the at least one first PPDU, and the at least one second PPDU;
wherein one of the following:
the at least one first PPDU comprises one high efficiency (HE) multi-user (MU) PPDU, and the at least one second PPDU comprises one or two extremely high throughput (EHT) MU PPDUs for downlink transmission;
the at least one first PPDU comprises one HE MU PPDU, and the at least one second PPDU comprises one EHT MU PPDU, and one post-EHT MU PPDU for downlink transmission;
the at least one first PPDU comprises one or more HE trigger-based (TB) PPDUs, and the at least one second PPDU comprises one or more EHT TB PPDUs for uplink transmission; and
the at least one first PPDU comprises one or more HE TB PPDUs, and the at least one second PPDU comprises one or more EHT TB PPDUs, and one or more post-EHT TB PPDU for uplink transmission.

9. The wireless communication method of claim 8, wherein the phase rotation is applied to the A-PPDU according to at least one bandwidth of the at least one first PPDU and at least one bandwidth of the at least one second PPDU,
wherein the phase rotation is applied to the at least one first PPDU according to the at least one bandwidth of the at least one first PPDU and the phase rotation is applied to the at least one second PPDU according to the at least one bandwidth of the at least one second PPDU.

10. The wireless communication method of claim 8, wherein the phase rotation is applied to the A-PPDU according to a bandwidth of the A-PPDU,
wherein the phase rotation is applied to the at least one first PPDU and/or the at least one second PPDU having a same bandwidth as the bandwidth of the A-PPDU.

11. The wireless communication method of claim 8, wherein the phase rotation is applied to the A-PPDU according to a total bandwidth of the at least one first PPDU and the at least one second PPDU.

12. The wireless communication method of claim 11, wherein when the total bandwidth of the at least one first PPDU and the at least one second PPDU is smaller than or equal to a half bandwidth of the A-PPDU, the A-PPDU is treated as a compressed A-PPDU having a bandwidth equal to the half bandwidth of the A-PPDU, and the phase rotation is applied to the compressed A-PPDU,
wherein the phase rotation is applied to the at least one first PPDU and/or the at least one second PPDU having a same bandwidth as the bandwidth of the compressed A-PPDU.

13. The wireless communication method of claim 11, wherein when the total bandwidth of the at least one first PPDU and the at least one second PPDU is larger than a half bandwidth of the A-PPDU, the phase rotation is applied to the at least one first PPDU and/or the at least one second PPDU having a same bandwidth as the bandwidth of the A-PPDU.

14. The wireless communication method of claim 8, wherein the A-PPDU comprises a frequency-domain (FD) A-PPDU (FD-A-PPDU).

15. An access point (AP), comprising:
a memory;
a transceiver; and
a processor coupled to the memory and the transceiver;
wherein the processor is configured to:
configure an aggregated physical layer (PHY) protocol data unit (A-PPDU) to a set of stations (STAs), wherein the A-PPDU comprises at least one first PPDU and at least one second PPDU, phase rotation is applied to the A-PPDU according to at least one bandwidth associated with at least one of the A-PPDU, the at least one first PPDU, and the at least one second PPDU;
wherein one of the following:
the at least one first PPDU comprises one high efficiency (HE) multi-user (MU) PPDU, and the at least one second PPDU comprises one or two extremely high throughput (EHT) MU PPDUs for downlink transmission;
the at least one first PPDU comprises one HE MU PPDU, and the at least one second PPDU comprises one EHT MU PPDU, and one post-EHT MU PPDU for downlink transmission;
the at least one first PPDU comprises one or more HE trigger-based (TB) PPDUs, and the at least one second PPDU comprises one or more EHT TB PPDUs for uplink transmission; and
the at least one first PPDU comprises one or more HE TB PPDUs, and the at least one second PPDU comprises one or more EHT TB PPDUs, and one or more post-EHT TB PPDU for uplink transmission.

\* \* \* \* \*